United States Patent
Yonezawa et al.

(10) Patent No.: US 11,106,021 B2
(45) Date of Patent: Aug. 31, 2021

(54) ZOOM LENS AND IMAGING APPARATUS

(71) Applicant: FUJIFILM Corporation, Tokyo (JP)

(72) Inventors: Masaru Yonezawa, Saitama (JP); Daiki Komatsu, Saitama (JP); Takashi Kunugise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

(21) Appl. No.: 16/541,828

(22) Filed: Aug. 15, 2019

(65) Prior Publication Data

US 2020/0064601 A1 Feb. 27, 2020

(30) Foreign Application Priority Data

Aug. 21, 2018 (JP) .............................. JP2018-154923

(51) Int. Cl.
*G02B 15/14* (2006.01)
*G02B 15/167* (2006.01)

(52) U.S. Cl.
CPC ....... *G02B 15/1441* (2019.08); *G02B 15/167* (2013.01)

(58) Field of Classification Search
CPC ........................... G02B 15/17; G02B 15/1441; G02B 15/1465; G02B 15/167; G02B 15/144109
See application file for complete search history.

(56) References Cited

U.S. PATENT DOCUMENTS

2015/0378134 A1 12/2015 Koga

FOREIGN PATENT DOCUMENTS

| JP | S61-270717 A | 12/1986 |
|----|--------------|---------|
| JP | 2017-078770 A | 4/2017 |
| JP | 2017-083563 A | 5/2017 |
| WO | 2014/132864 A1 | 9/2014 |

OTHER PUBLICATIONS

An Office Action; "Notice of Reasons for Refusal", mailed by the Japanese Patent Office dated Apr. 27, 2021, which corresponds to Japanese Patent Application No. 2018-154923 and is related to U.S. Appl. No. 16/541,828; with English language translation.

*Primary Examiner* — Jack Dinh
(74) *Attorney, Agent, or Firm* — Studebaker & Brackett PC

(57) ABSTRACT

The zoom lens consists of, in order from an object side: a positive first lens group that does not move during zooming; a middle group that consists of two or more movable lens groups moving during zooming; and a subsequent group that has a lens group including a stop at a position closest to the object side. The middle group has at least two negative movable lens groups. At least one negative movable lens group in the middle group includes at least one negative LN lens which satisfies predetermined conditional expressions relating to the refractive index, the Abbe number, and the partial dispersion ratio.

19 Claims, 12 Drawing Sheets

EXAMPLE 1

EXAMPLE 1

EXAMPLE 1

WIDE-ANGLE END

MIDDLE

TELEPHOTO END

EXAMPLE 2

EXAMPLE 3

EXAMPLE 4

EXAMPLE 5

EXAMPLE 1

EXAMPLE 2

EXAMPLE 3

EXAMPLE 4

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2018-154923, filed on Aug. 21, 2018. The above application is hereby expressly incorporated by reference, in its entirety, into the present application.

BACKGROUND OF THE INVENTION

1. Field of the Invention

The present invention relates to a zoom lens and an imaging apparatus.

2. Description of the Related Art

In the related art, as a zoom lens used in broadcast cameras, movie imaging cameras, digital cameras, and the like, there is known a type in which a lens group having a positive refractive power is disposed to be closest to the object side, a movable lens group moves to the image side during zooming, and the total length of the lens system remains unchanged during zooming. For example, JP2017-078770A and JP2017-083563A describe the above-mentioned type zoom lenses each having five or six lens groups.

SUMMARY OF THE INVENTION

The zoom lenses used in the cameras are required to have high performance and small aberration fluctuation during zooming. In order to ensure the zoom ratio, it is necessary to increase the refractive power of the movable lens group, which tends to increase fluctuation in chromatic aberration and fluctuation in spherical aberration during zooming. In order to suppress fluctuation in chromatic aberration during zooming, it is desirable to suppress chromatic aberration independently of the movable lens group and the lens group which has a positive refractive power and is closest to the object side. In such a case, particularly, it is important to arrange refractive powers and select the material of the lenses of the movable lens group for suppressing fluctuation in secondary chromatic aberration.

On the other hand, in a case where fluctuation in spherical aberration during zooming is not sufficiently suppressed, a problem arises in that the F number can not be reduced at the telephoto end. In the lens systems described in JP2017-078770A and JP2017-083563A, the suppression of fluctuation in spherical aberration during zooming is not sufficient, and there is room for improvement.

The present invention has been made in view of the above circumstances. According to an embodiment of the present invention, it is an object to provide a zoom lens having high optical performance by suppressing fluctuation in chromatic aberration and fluctuation in spherical aberration during zooming and an imaging apparatus comprising the zoom lens.

The specific means for achieving the object includes the following aspects.

<1> A zoom lens consisting of, in order from an object side to an image side: a first lens group that remains stationary with respect to an image plane during zooming and has a positive refractive power; a middle group that consists of two or more movable lens groups moving along an optical axis by changing a distance between groups adjacent to each other during zooming; and a subsequent group that has a lens group including a stop at a position closest to the object side, where at least two movable lens groups in the middle group each have a negative refractive power, where the at least one movable lens group having the negative refractive power in the middle group includes at least one LN lens which is a negative lens, and where assuming that a refractive index of the LN lens at a d line is Ndn, an Abbe number of the LN lens based on the d line is νdn, and a partial dispersion ratio of the LN lens between a g line and an F line is θgFn, the LN lens satisfies Conditional Expressions (1), (2), (3), and (4) represented by $$1.72 < Ndn < 1.8 \quad (1),$$

$$43 < \nu dn < 57 \quad (2),$$

$$0.6355 < \theta gFn + 0.001625 \times \nu dn < 0.66 \quad (3), \text{ and}$$

$$2.21 < Ndn + 0.01 \times \nu dn \quad (4).$$

<2> The zoom lens according to <1>, where the movable lens group, which has the negative refractive power in the middle group, closer to the object side than the movable lens group, which has the negative refractive power and is closest to the image side in the middle group, includes the LN lens, and where assuming that a focal length of the movable lens group which has the negative refractive power in the middle group and includes the LN lens, which has a strongest negative refractive power among the LN lenses, which are included in the movable lens group having the negative refractive power in the middle group and being located to be closer to the object side than the movable lens group, which has the negative refractive power and is closest to the image side in the middle group, is fA, and a focal length of the movable lens group, which has the negative refractive power and is closest to the image side in the middle group, is fB, Conditional Expression (5) is satisfied, which is represented by $$0.6 < fB/fA < 4.5 \quad (5).$$

<3> The zoom lens according to <1> or <2>, where the movable lens group, which has the negative refractive power in the middle group, closer to the object side than the movable lens group, which has the negative refractive power and is closest to the image side in the middle group, includes the LN lens, and where assuming that a focal length of the movable lens group which has the negative refractive power in the middle group and includes the LN lens, which has a strongest negative refractive power among the LN lenses, which are included in the movable lens group having the negative refractive power in the middle group and being located to be closer to the object side than the movable lens group, which has the negative refractive power and is closest to the image side in the middle group, is fA, and a focal length of the LN lens, which has the strongest negative refractive power, among the LN lenses, which are included in the movable lens group having the negative refractive power in the middle group, is fLNm, Conditional Expression (6) is satisfied, which is represented by $$0.5 < fLNm/fA < 40 \quad (6).$$

<4> The zoom lens according to any one of <1> to <3>, where the at least one movable lens group in the middle group includes a cemented lens in which at least one LN lens and at least one positive lens are cemented.

<5> The zoom lens according to <4>, where assuming that an Abbe number of the at least one LN lens of the cemented lens based on the d line is υdcn, and an Abbe number of at least one positive lens of the cemented lens based on the d line is υdcp, at least one of the cemented lenses satisfies Conditional Expression (7) represented by $$18 < \upsilon dcn - \upsilon dcp < 35 \quad (7).$$

<6> The zoom lens according to any one of <1> to <5>, where the movable lens group having the strongest negative refractive power among the movable lens groups having the negative refractive powers in the middle group includes the LN lens.

<7> The zoom lens according to any one of <1> to <6>, where focusing is performed by moving at least a part of lenses in the first lens group along the optical axis.

<8> The zoom lens according to any one of <1> to <7>, where the movable lens group closest to the image side in the middle group has a negative refractive power.

<9> The zoom lens according to <8>, where the middle group consists of the two movable lens groups having the negative refractive powers, and where the subsequent group consists of a lens group which remains stationary with respect to the image plane during zooming and has a positive refractive power.

<10> The zoom lens according to <8>, where the middle group consists of the two movable lens groups having the negative refractive powers, and where the subsequent group consists of, in order from the object side to the image side, a lens group, which moves along the optical axis by changing a distance between the groups adjacent to each other during zooming and has a positive refractive power, and a lens group which remains stationary with respect to the image plane during zooming and has a positive refractive power.

<11> The zoom lens according to <8>, where the middle group consists of, in order from the object side to the image side, the movable lens group having a positive refractive power and the two movable lens groups having the negative refractive powers, and where the subsequent group consists of a lens group which remains stationary with respect to the image plane during zooming and has a positive refractive power.

<12> The zoom lens according to <8>, where the middle group consists of the three movable lens groups having the negative refractive powers, and where the subsequent group consists of a lens group which remains stationary with respect to the image plane during zooming and has a refractive power.

<13> The zoom lens according to <8>, where the middle group consists of the four movable lens groups having the negative refractive powers, and where the subsequent group consists of a lens group which remains stationary with respect to the image plane during zooming and has a positive refractive power.

<14> The zoom lens according to any one of <1> to <13>, where the LN lens further satisfies Conditional Expression (2-1) represented by $$45 < \upsilon dn < 55 \quad (2\text{-}1).$$

<15> The zoom lens according to any one of <1> to <14>, where the LN lens further satisfies Conditional Expression (3-1) represented by $$0.637 < \theta gFn + 0.001625 \times \upsilon dn < 0.65 \quad (3\text{-}1).$$

<16> The zoom lens according to any one of <1> to <15>, where the LN lens further satisfies Conditional Expression (4-1) represented by $$2.21 < Ndn + 0.01 \times \upsilon dn < 2.33 \quad (4\text{-}1).$$

<17> The zoom lens according to <2>, where Conditional Expression (5-1) is satisfied, which is represented by $$2 < fB/fA < 4 \quad (5\text{-}1).$$

<18> The zoom lens according to <3>, where Conditional Expression (6-1) is satisfied, which is represented by $$0.5 < fLNm/fA < 4 \quad (6\text{-}1).$$

<19> An imaging apparatus comprising the zoom lens according to any one of <1> to <18>.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "lens group" is not limited to a configuration using a plurality of lenses, but may consist of only one lens. Further, regarding the "one lens group", a lens group in which the distance in the direction of the optical axis between the groups adjacent to each other changes during zooming is regarded as "one lens group". That is, in a case where the lens group is divided at intervals changing during zooming, the lens group included in one division is regarded as one lens group.

A compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" used in a conditional expression is a paraxial focal length. The values used in the conditional expressions are values in the case of using the d line as a reference in a state where the object at infinity is in focus. The partial dispersion ratio θgF between the g line and the F line of a certain lens is defined by θgF=(Ng−NF)/(NF−NC), where Ng, NF, and NC are the refractive indices of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to an embodiment of the present invention, it is possible to provide a zoom lens having high optical performance by suppressing fluctuation in chromatic aberration and fluctuation in spherical aberration during zooming and an imaging apparatus comprising the zoom lens.

DESCRIPTION OF THE PREFERRED EMBODIMENTS

Figure 1:
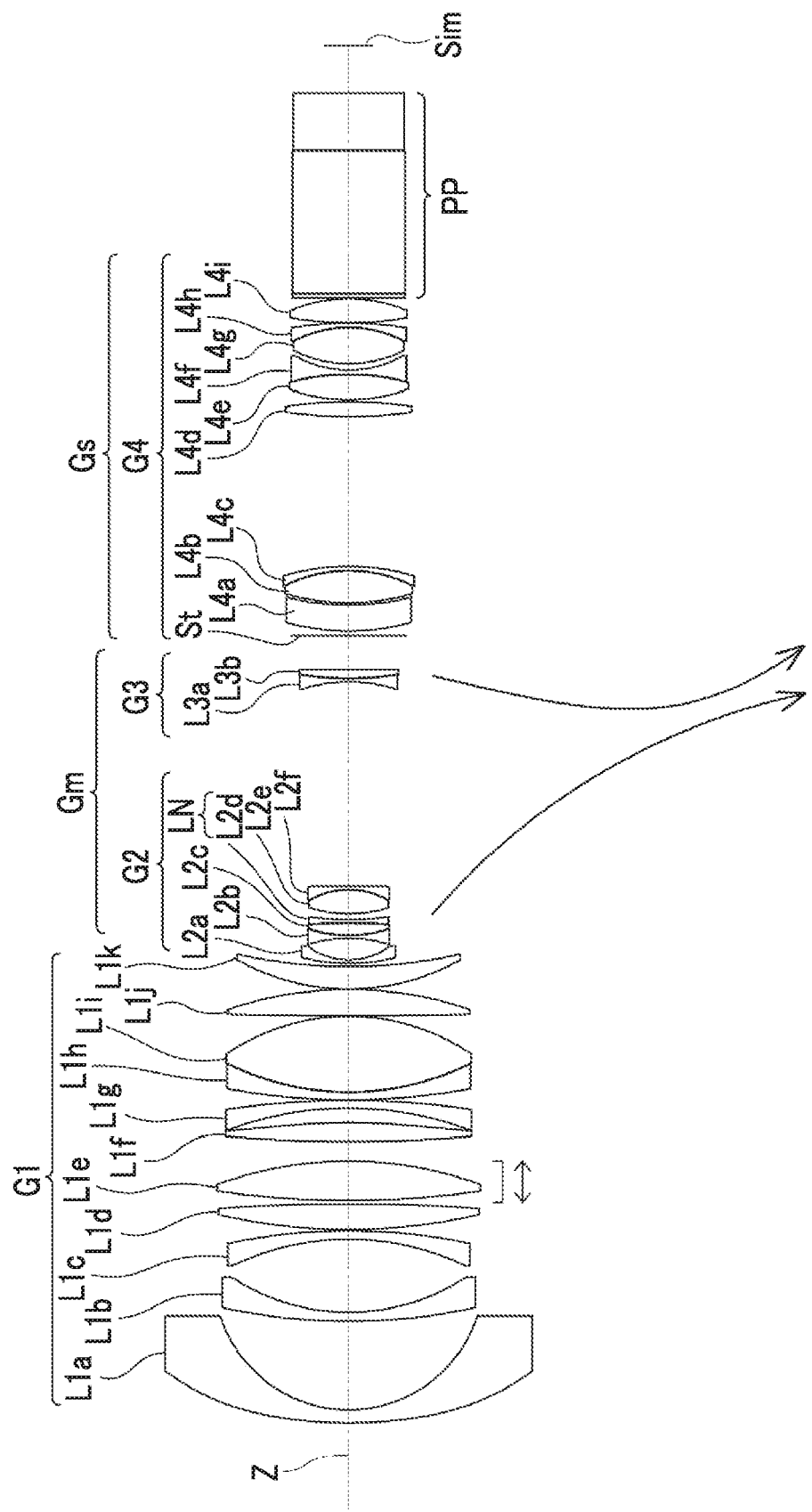
FIG. 1 is a diagram illustrating a cross-sectional view of a configuration of a zoom lens according to an embodiment of the present invention and a movement locus corresponding to the zoom lens of Example 1 of the present invention.
Figure 2:
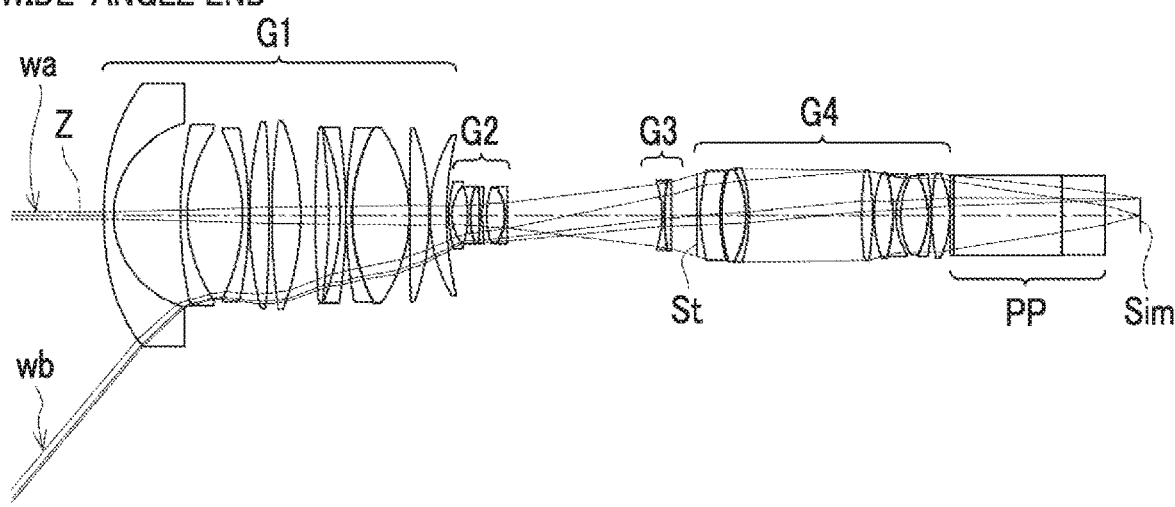
FIG. 2 is a cross-sectional view illustrating a configuration of the zoom lens and rays shown in FIG. 1.
Figure 2:
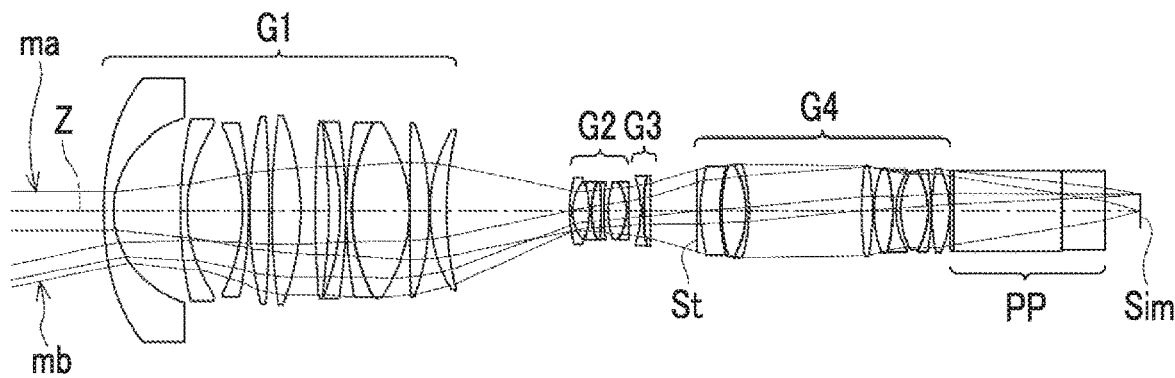
Figure 2:
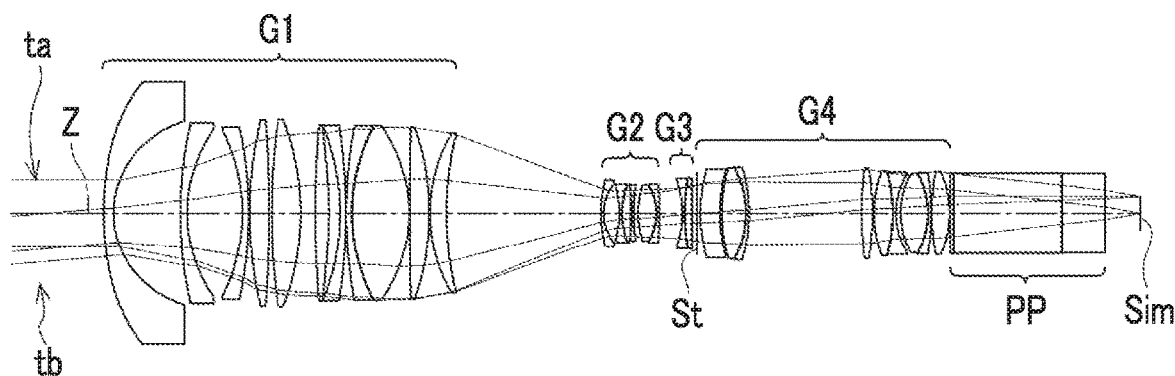

Hereinafter, embodiments of the zoom lens of the present invention will be described in detail with reference to the drawings. FIG. 1 is a cross-sectional view illustrating a configuration and a movement locus of a zoom lens according to an embodiment of the present invention. FIG. 2 is a cross-sectional view illustrating the lens configuration and the rays in each state of the zoom lens. The examples shown in FIGS. 1 and 2 correspond to the zoom lens of Example 1 to be described later. FIGS. 1 and 2 each show a situation where the object at infinity is in focus, the left side thereof is an object side, and the right side thereof is an image side. FIG. 1 shows the wide-angle end state. In FIG. 2, the upper part labeled "WIDE-ANGLE END" indicates the wide-angle end state, the middle part labeled "MIDDLE" indicates the middle focal length state, and the lower part labeled "TELEPHOTO END" indicates the telephoto end state. FIG. 2 shows rays including on-axis rays wa and rays with the maximum angle of view wb at the wide-angle end state, on-axis rays ma and rays with the maximum angle of view mb at the middle focal length state, and on-axis rays to and rays with the maximum angle of view tb at the telephoto end state.

Further, FIGS. 1 and 2 show an example in which, assuming that a zoom lens is applied to an imaging apparatus, an optical member PP of which the incident surface and the exit surface are parallel is disposed between the zoom lens and the image plane Sim. The optical member PP is a member assumed to include various filters, a prism, a cover glass, and/or the like. The various filters include, for example, a low pass filter, an infrared cut filter, and a filter that cuts a specific wavelength region. The optical member PP has no refractive power, and the optical member PP may be configured to be omitted. Hereinafter, description will be given mainly with reference to FIG. 1.

The zoom lens of the present invention consists of, in order from the object side to the image side along the optical axis Z, a first lens group G1, a middle group Gm, and a subsequent group Gs. The first lens group G1 is a lens group which remains stationary with respect to the image plane Sim during zooming and has a positive refractive power. The middle group Gm consists of two or more movable lens groups which move along the optical axis Z by changing the distance between groups adjacent to each other during zooming. That is, the middle group Gm consists of two or more movable lens groups that move along the optical axis Z with loci different from each other during zooming. At least two movable lens groups in the middle group Gm each have a negative refractive power. The subsequent group Gs has a lens group including an aperture stop St at the position closest to the object side.

By making the lens group closest to the object side as a lens group having a positive refractive power, it is possible to shorten the total length of the lens system (the distance from the lens surface closest to the object side to the image plane Sim). As a result, there is an advantage in achieving reduction in size. Further, the lens group, which has a positive refractive power and is closest to the object side, is configured to remain stationary during zooming. In such a configuration, the total length of the lens system does not change during zooming, and it is possible to reduce fluctuation in barycenter of the lens system. Thus, it is possible to improve the convenience at the time of imaging. Further, two or more movable lens groups having negative refractive powers are disposed to be closer to the object side than the lens group including the aperture stop St. Thereby, it is possible to disperse the refractive power of the negative movable lens group having a zooming function. As a result, fluctuation in spherical aberration and the variation of chromatic aberration during zooming can be reduced. Thereby, there is an advantage in achieving both small F number and high magnification.

The zoom lens of the example shown in FIG. 1 consists of, in order from the object side to the image side, a first lens group G1 having a positive refractive power, a second lens group G2 having a negative refractive power, a third lens group G3 having a negative refractive power, and a fourth lens group G4 having a refractive power. During zooming, the first lens group G1 and the fourth lens group G4 remain with respect to the image plane Sim. The second lens group G2 and the third lens group G3 are movable lens groups that move along the optical axis Z by changing the distance between groups adjacent to each other during zooming. The aperture stop St is disposed to be closest to the object side of the fourth lens group G4. The aperture stop St shown in FIG. 1 does not show its shape but shows its position in the direction of the optical axis. In the example shown in FIG. 1, the group consisting of the second lens group G2 and the third lens group G3 corresponds to the middle group Gm, and the fourth lens group G4 corresponds to the subsequent group Gs. In FIG. 1, the movement locus of each movable lens group during zooming from the wide-angle end to the telephoto end under the movable lens group is schematically indicated by the arrow.

In the example shown in FIG. 1, the first lens group G1 consists of eleven lenses L1a to L1k in order from the object side to the image side, and the second lens group G2 consists of six lenses L2a to L2f in order from the object side to the image side, the third lens group G3 consists of two lenses L3a and L3b in order from the object side to the image side, and the fourth lens group G4 consists of the aperture stop St and nine lenses L4a to L4i in order from the object side to the image side. However, in the zoom lens of the present invention, the number of lens groups constituting the middle group Gm and the subsequent group Gs, the number of lenses constituting each lens group, and the position of the aperture stop St may be set to be different from those in the example shown in FIG. 1.

In the zoom lens of the present invention, the at least one movable lens group having the negative refractive power in the middle group Gm includes at least one LN lens LN which is a negative lens. Assuming that a refractive index of the LN lens LN at the d line is Ndn, an Abbe number of the LN lens LN based on the d line is νdn, and a partial dispersion ratio of the LN lens LN between a g line and an F line is θgFn, the LN lens LN satisfies Conditional Expressions (1), (2), (3), and (4).

$$1.72 < Ndn < 1.8 \quad (1)$$

$$43 < \nu dn < 57 \quad (2)$$

$$0.6355 < \theta gFn + 0.001625 \times \nu dn < 0.66 \quad (3)$$

$$2.21 < Ndn + 0.01 \times \nu dn \quad (4)$$

Conditional Expressions (1), (2), (3) and (4) are conditional expressions relating to the material of the LN lens LN. By not allowing the result of Conditional Expression (1) to be equal to or less than the lower limit, it is possible to select a material with a high refractive index. Thus, while achieving reduction in size and high magnification, it becomes easy to satisfactorily suppress fluctuation in various aberrations during zooming. By not allowing the result of Conditional Expression (1) to be equal to or greater than the upper limit, it is possible to select a low dispersion material. Thus, it becomes easy to satisfactorily suppress fluctuation in chromatic aberration during zooming.

By not allowing the result of Conditional Expression (2) to be equal to or less than the lower limit, it is possible to select a low dispersion material. Thus, it becomes easy to satisfactorily suppress fluctuation in chromatic aberration during zooming. By not allowing the result of Conditional Expression (2) to be equal to or greater than the upper limit, it is possible to select a material with a high refractive index. Thus, while achieving reduction in size and high magnification, it becomes easy to satisfactorily suppress fluctuation in various aberrations during zooming. In addition, in a case of a configuration in which Conditional Expression (2-1) is satisfied, it is possible to obtain more favorable characteristics.

$$45 < \nu dn < 55 \quad (2\text{-}1)$$

By satisfying Conditional Expression (3), it becomes easy to satisfactorily suppress fluctuation in secondary chromatic aberration during zooming. In addition, in a case of a configuration in which Conditional Expression (3-1) is satisfied, it is possible to obtain more favorable characteristics.

$$0.637 < \theta gFn + 0.001625 \times \nu dn < 0.65 \quad (3\text{-}1)$$

By satisfying Conditional Expressions (1) and (2) and by not allowing the result of Conditional Expression (4) to be equal to or less than the lower limit, while achieving reduction in size and high magnification, it becomes easy to satisfactorily suppress fluctuation in various aberrations including chromatic aberration during zooming. In order to select a suitable material satisfying Conditional Expressions (1) and (2) from existing optical materials, it is preferable to satisfy Conditional Expression (4-1).

$$2.21 < Ndn + 0.01 \times \nu dn < 2.33 \quad (4\text{-}1)$$

For example, in the example shown in FIG. 1, the lens L2d of the second lens group G2 corresponds to the LN lens LN. However, in the zoom lens of the present invention, the LN lens LN may be different from the example shown in FIG. 1.

Among the movable lens groups having negative refractive powers in the middle group Gm, it is preferable that the movable lens group having the strongest negative refractive power includes the LN lens LN. In such a case, it becomes easy to suppress fluctuation in chromatic aberration during zooming.

Further, it is preferable that the movable lens group (second lens group G2 in the example shown in FIG. 1), which has the negative refractive power in the middle group Gm, closer to the object side than the movable lens group (third lens group G3 in the example shown in FIG. 1), which has the negative refractive power and is closest to the image side in the middle group Gm, includes the LN lens LN. In such a case, it is possible to satisfactorily suppress fluctuation in lateral chromatic aberration during zooming from the wide-angle end to the middle zoom range.

The movable lens group, which has the negative refractive power in the middle group Gm, closer to the object side than the movable lens group, which has the negative refractive power and is closest to the image side in the middle group Gm, includes the LN lens LN. In this configuration, assuming that a focal length of the movable lens group which has the negative refractive power in the middle group and includes the LN lens LN, which has a strongest negative refractive power among the LN lenses LN, which are included in the movable lens group having the negative refractive power in the middle group Gm and being located to be closer to the object side than the movable lens group, which has the negative refractive power and is closest to the image side in the middle group Gm, is fA, and a focal length of the movable lens group, which has the negative refractive power and is closest to the image side in the middle group Gm, is fB, it is preferable to satisfy Conditional Expression (5). By not allowing the result of Conditional Expression (5) to be equal to or less than the lower limit, it is possible to ensure the effect of correcting the longitudinal chromatic aberration and the lateral chromatic aberration during zooming through the LN lens LN. As a result, it becomes easy to suppress these aberrations during zooming. By not allowing the result of Conditional Expression (5) to be equal to or greater than the upper limit, it is possible to prevent the negative refractive power of the lens group including the LN lens LN from becoming excessively strong. As a result, it becomes easy to suppress fluctuation in longitudinal chromatic aberration and lateral chromatic aberration during zooming. In addition, in a case of a configuration in which Conditional Expression (5-1) is satisfied, it is possible to obtain more favorable characteristics.

$$0.6 < fB/fA < 4.5 \quad (5)$$

$$2 < fB/fA < 4 \quad (5\text{-}1)$$

Further, the movable lens group, which has the negative refractive power in the middle group Gm, closer to the object side than the movable lens group, which has the negative refractive power and is closest to the image side in the middle group Gm, includes the LN lens LN. In this configuration, assuming that a focal length of the movable lens group which has the negative refractive power in the middle group and includes the LN lens LN, which has a strongest negative refractive power among the LN lenses LN, which are included in the movable lens group having the negative refractive power in the middle group Gm and being located to be closer to the object side than the movable lens group, which has the negative refractive power and is closest to the image side in the middle group Gm, is fA, and a focal length of the LN lens LN, which has the strongest negative refractive power, among the LN lenses LN, which are included in the movable lens group having the negative refractive power in the middle group Gm, is fLNm, it is preferable to satisfy Conditional Expression (6). By satisfying Conditional Expression (6), it becomes easy to satisfactorily suppress fluctuation in primary chromatic aberration and fluctuation in secondary chromatic aberration during zooming. In addition, in a case of a configuration in which Conditional Expression (6-1) is satisfied, it is possible to obtain more favorable characteristics.

$$0.5 < fLNm/fA < 40 \qquad (6)$$

$$0.5 < fLNm/fA < 4 \qquad (6\text{-}1)$$

Further, it is preferable that the at least one movable lens group in the middle group Gm includes a cemented lens in which at least one LN lens LN and at least one positive lens are cemented. In such a case, it becomes easy to suppress fluctuation in chromatic aberration during zooming. It should be noted that the cemented lens described herein may be a cemented lens consisting of two lenses or a cemented lens consisting of three lenses.

In the configuration in which the at least one movable lens group in the middle group Gm includes a cemented lens in which at least one LN lens LN and at least one positive lens are cemented, assuming that an Abbe number of the at least one LN lens LN of the cemented lens based on the d line is vdcn, and an Abbe number of at least one positive lens of the cemented lens based on the d line is vdcp, it is preferable that at least one of the cemented lenses satisfies Conditional Expression (7). Here, it is assumed that the LN lens LN and the positive lens satisfying Conditional Expression (7) are lenses in the same cemented lens. By satisfying Conditional Expression (7), it becomes easy to satisfactorily suppress fluctuation in primary chromatic aberration during zooming.

$$18 < vdcn - vdcp < 35 \qquad (7)$$

It is preferable that the first lens group G1 includes a focus group which is a lens group that moves during focusing. That is, it is preferable that focusing is performed by moving at least a part of lenses in the first lens group G1 along the optical axis Z. Since the first lens group G1 does not move during zooming, in a case where at least a part of the lenses in the first lens group G1 is used as the focus group, the image point of the focus group does not move during zooming. Therefore, focus shift during zooming can be suppressed.

It is preferable that the movable lens group closest to the image side in the middle group Gm has a negative refractive power. In such a case, in a case of correcting fluctuation in image position during zooming, it is possible to move the movable lens group to the image side from the telephoto side, and it becomes easy to ensure the zoom stroke of the movable lens group mainly responsible for the zooming function. As a result, there is an advantage in reduction in size and high magnification.

The middle group Gm and the subsequent group Gs can have, for example, the configurations described below. The middle group Gm can be configured to consist of the two movable lens groups having the negative refractive powers. The subsequent group Gs can be configured to consist of a lens group which includes the aperture stop St, remains stationary with respect to the image plane Sim during zooming, and has a positive refractive power. In such a case, the zoom stroke of the movable lens group is reduced, and the total length of the lens system can be shortened. Therefore, there is an advantage in reduction in size.

Alternatively, the middle group Gm can be configured to consist of the two movable lens groups having the negative refractive powers. In addition, the subsequent group Gs can be configured to consist of, in order from the object side to the image side, a lens group, which includes the aperture stop St, moves along the optical axis Z by changing a distance between the groups adjacent to each other during zooming, and has a positive refractive power, and a lens group which remains stationary with respect to the image plane Sim and has a positive refractive power. In such a case, it becomes easy to achieve reduction in size, high magnification, and suppression of fluctuation in various aberrations during zooming. In addition, in the middle zoom range where the off-axis ray is the highest, the movable lens group having a positive refractive power including the aperture stop St can be extended to the object side. Thus, the lens diameter of the first lens group G1 can be suppressed. As a result, there is an advantage in achieving reduction in size of the first lens group G1.

Alternatively, the middle group Gm can be configured to consist of, in order from the object side to the image side, the movable lens group having a positive refractive power and the two movable lens groups having the negative refractive powers. In addition, the subsequent group Gs can be configured to consist of a lens group which includes the aperture stop St, remains stationary with respect to the image plane Sim during zooming, and has a positive refractive power. In such a case, it becomes easy to achieve reduction in size, high magnification, and suppression of fluctuation in various aberrations during zooming. In particular, there is an advantage in suppressing fluctuation in spherical aberration during zooming.

Alternatively, the middle group Gm can be configured to consist of the three movable lens groups having the negative refractive powers. In addition, the subsequent group Gs can be configured to consist of a lens group which includes the aperture stop St, remains stationary with respect to the image plane Sim during zooming, and has a refractive power. In such a case, it becomes easy to achieve reduction in size, high magnification, and suppression of fluctuation in various aberrations during zooming. In particular, there is an advantage in suppressing fluctuation in field curvature during zooming.

Alternatively, the middle group Gm can be configured to consist of the four movable lens groups having the negative refractive powers. In addition, the subsequent group Gs can be configured to consist of a lens group which includes the aperture stop St, remains stationary with respect to the image plane Sim during zooming, and has a positive refractive power. In such a case, it becomes easy to achieve reduction in size, high magnification, and suppression of fluctuation in various aberrations during zooming. In particular, there are advantages in suppressing fluctuation in field curvature and fluctuation in spherical aberration during zooming.

The above-mentioned preferred configurations and available configurations may be optional combinations, and it is preferable to selectively adopt the configurations in accordance with required specification. According to the technology of the present invention, it is possible to realize a zoom lens having high optical performance by suppressing fluctuation in chromatic aberration and fluctuation in spherical aberration during zooming.

Next, numerical examples of the zoom lens of the present invention will be described.

Example 1

FIG. 1 is a cross-sectional view of a zoom lens of Example 1, and an illustration method and a configuration thereof is as described above. Therefore, repeated description is partially omitted herein. The zoom lens of Example 1 consists of, in order from the object side to the image side, a first lens group G1 having a positive refractive power, a second lens group G2 having a negative refractive power, a third lens group G3 having a negative refractive power, and a fourth lens group G4 having a positive refractive power. The middle group Gm consists of a second lens group G2 and a third lens group G3. The subsequent group Gs consists of a fourth lens group G4. During zooming, the first lens group G1 and the fourth lens group G4 remain with respect to the image plane Sim, and the second lens group G2 and the third lens group G3 move along the optical axis Z by changing the distance between the lenses adjacent to each other.

The first lens group G1 consists of eleven lenses L1a to L1k in order from the object side to the image side. The second lens group G2 consists of six lenses L2a to L2f in order from the object side to the image side. The third lens group G3 consists of two lenses L3a and L3b in order from the object side to the image side. The fourth lens group G4 consists of an aperture stop St and nine lenses L4a to L4i in order from the object side to the image side. The lens L2d corresponds to the LN lens LN. The focus group consists of the lens L1e.

Tables 1A and 1B show basic lens data of the zoom lens of Example 1, Table 2 shows values of specification and variable surface distances, and Table 3 shows aspheric surface coefficients thereof. Tables 1A and 1B show the basic lens data which is divided into two tables in order to prevent one table from becoming long. In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element at the d line, and the column of θgF shows a partial dispersion ratio of each constituent element between the g line and the F line.

In Tables 1A and 1B, the sign of the radius of curvature of the surface convex toward the object side is positive and the sign of the radius of curvature of the surface convex toward the image side is negative. Table 1B also shows the aperture stop St and the optical member PP, and in a place of a surface number of a surface corresponding to the aperture stop St, the surface number and a term of (St) are noted. A value at the bottom place of D in Table 1B indicates a distance between the image plane Sim and the surface closest to the image side in the table. In Tables 1A and 1B, the variable surface distances during zooming are referenced by the reference signs DD[ ], and are written into places of D, where object side surface numbers of distances are noted in[ ].

In the range of Table 2, values of the zoom ratio Zr, the focal length f, the F number FNo, the maximum total angle of view 2ω, and the variable surface distance are based on the d line. (°) in the place of 2ω indicates that the unit thereof is a degree. In Table 2, the values at the wide-angle end state, the middle focal length state, and the telephoto end state are shown in the columns denoted as the wide-angle end, the middle, and the telephoto end, respectively.

In Tables 1A and 1B, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m is an integer of 3 or more) shows numerical values of the aspheric surface coefficients for each aspheric surface. The "E±n" (n: an integer) in numerical values of the aspheric surface coefficients of Table 3 indicates "$\times 10^{\pm n}$". KA and Am are the aspheric surface coefficients in the aspheric expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric surface coefficients, $\Sigma$ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | Vd | θgF |
|---|---|---|---|---|---|
| *1 | 112.05486 | 3.000 | 1.80610 | 33.27 | 0.5885 |
| 2 | 31.98770 | 20.484 | | | |
| *3 | 163.75867 | 2.000 | 1.62001 | 56.94 | 0.5453 |
| 4 | 50.75686 | 16.848 | | | |
| 5 | −64.36966 | 1.930 | 1.95375 | 32.32 | 0.5901 |
| 6 | −140.68914 | 0.300 | | | |
| 7 | 136.33230 | 5.960 | 1.82498 | 23.78 | 0.6200 |
| 8 | −406.68444 | 0.750 | | | |
| 9 | 222.60173 | 9.083 | 1.55404 | 74.37 | 0.5415 |
| 10 | −90.49986 | 4.440 | | | |
| 11 | 357.47252 | 4.218 | 1.43875 | 94.66 | 0.5340 |
| *12 | −147.10239 | 3.338 | | | |
| 13 | −82.60972 | 1.800 | 1.76754 | 46.51 | 0.5593 |
| 14 | −197.76427 | 0.100 | | | |
| 15 | 159.57415 | 1.800 | 1.94272 | 29.30 | 0.6003 |
| 16 | 65.00119 | 17.474 | 1.41390 | 100.82 | 0.5337 |
| 17 | −51.79802 | 0.120 | | | |
| 18 | 1242.12695 | 6.068 | 1.41390 | 100.82 | 0.5337 |
| 19 | −88.80350 | 0.100 | | | |
| 20 | 54.40497 | 5.153 | 1.72916 | 54.68 | 0.5445 |
| 21 | 120.29294 | DD[21] | | | |
| 22 | 45.90084 | 0.800 | 2.00100 | 29.13 | 0.5995 |
| 23 | 16.12303 | 4.891 | | | |
| 24 | −33.55758 | 0.760 | 1.76120 | 51.88 | 0.5484 |
| 25 | 29.53847 | 2.815 | 1.89286 | 20.36 | 0.6394 |
| 26 | −138.61046 | 0.810 | 1.72900 | 49.12 | 0.5574 |
| 27 | 68.65529 | 1.379 | | | |
| 28 | 31.97684 | 5.510 | 1.60835 | 37.17 | 0.5858 |
| 29 | −18.55230 | 0.800 | 1.81281 | 46.72 | 0.5572 |
| 30 | −506.03976 | DD[30] | | | |

TABLE 1A-continued

Example 1

| Sn | R | D | Nd | Vd | θgF |
|---|---|---|---|---|---|
| 31 | −36.15586 | 0.810 | 1.67165 | 57.92 | 0.5428 |
| 32 | 74.84462 | 2.029 | 1.83207 | 23.77 | 0.6202 |
| 33 | 115989.92673 | DD[33] | | | |

TABLE 1B

Example 1

| Sn | R | D | Nd | vd | θgF |
|---|---|---|---|---|---|
| 34(St) | ∞ | 1.000 | | | |
| *35 | 51.49771 | 6.000 | 1.79600 | 45.42 | 0.5726 |
| 36 | 60.00792 | 0.493 | | | |
| 37 | 53.44026 | 7.430 | 1.64479 | 42.32 | 0.5725 |
| 38 | −33.64933 | 1.000 | 2.00100 | 29.13 | 0.5995 |
| 39 | −53.69581 | 34.500 | | | |
| 40 | 107.79016 | 3.386 | 1.90000 | 21.31 | 0.6271 |
| 41 | −101.32017 | 0.500 | | | |
| 42 | 42.62906 | 5.654 | 1.61345 | 60.64 | 0.5430 |
| 43 | −53.96087 | 1.000 | 2.00100 | 29.13 | 0.5995 |
| 44 | 25.77644 | 1.469 | | | |
| 45 | 28.77031 | 8.312 | 1.49700 | 81.54 | 0.5375 |
| 46 | −27.92269 | 1.000 | 1.95375 | 32.32 | 0.5901 |
| 47 | −86.24838 | 0.120 | | | |
| 48 | 79.50526 | 5.528 | 1.48749 | 70.24 | 0.5301 |
| 49 | −35.20170 | 0.200 | | | |
| 50 | ∞ | 1.000 | 1.51633 | 64.14 | 0.5353 |
| 51 | ∞ | 33.000 | 1.60859 | 46.44 | 0.5666 |
| 52 | ∞ | 13.200 | 1.51633 | 64.05 | 0.5346 |
| 53 | ∞ | 10.924 | | | |

TABLE 2

Example 1

| | Wide-Angle End | Middle | Telephoto End |
|---|---|---|---|
| Zr | 1.00 | 5.00 | 12.55 |
| f | 4.674 | 23.370 | 58.658 |
| FNo. | 1.85 | 1.85 | 2.67 |
| 2ω(°) | 103.68 | 25.62 | 10.48 |
| DD[21] | 0.770 | 37.777 | 46.988 |
| DD[30] | 47.124 | 3.721 | 7.103 |
| DD[33] | 7.873 | 14.269 | 1.676 |

TABLE 3

Example 1

Sn

| | 1 | 3 | 12 | 35 |
|---|---|---|---|---|
| KA | 1.0000000E+00 | 1.0000000E+00 | 1.0000000E+00 | 1.∞∞∞∞0E+∞ |
| A4 | 6.9424288E−07 | 9.4978117E−07 | 1.5276922−06 | −4.5195518E−06 |
| A6 | 1.3970788E−10 | 3.9460279E−11 | −4.5152395−11 | −2.4748083E−10 |
| A8 | 1.3125248E−13 | −1.6897109E−12 | −4.0992029−13 | 3.1340865E−11 |
| A10 | −1.4945516E−16 | 2.1275734E−15 | 1.3006196E−15 | −3.6167994E−13 |
| A12 | 4.1665629E−20 | −5.1302380E−18 | −4.3658800−18 | 2.5782474E−15 |
| A14 | 1.0059271E−23 | 1.1242107E−20 | 9.092G332E−21 | −1.1637871E−17 |
| A16 | −2.6663153E−27 | −1.2271961E−23 | −1.0914656E−23 | 3.1832939E−20 |
| A18 | −2.5136743E−30 | 6.3024808E−27 | 6.9501868E−27 | −4.7984110E−23 |
| A20 | 7.5327294E−34 | −1.1701477E−30 | −1.8164208E−30 | 3.0558222E−26 |

Figure 7:
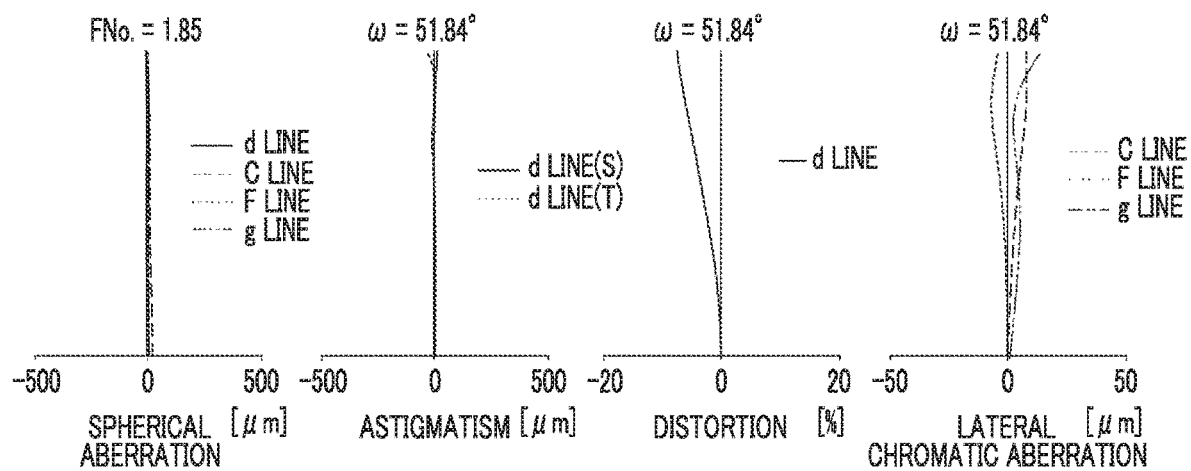
FIG. 7 is a diagram of aberrations of the zoom lens of Example 1 of the present invention.
Figure 7:
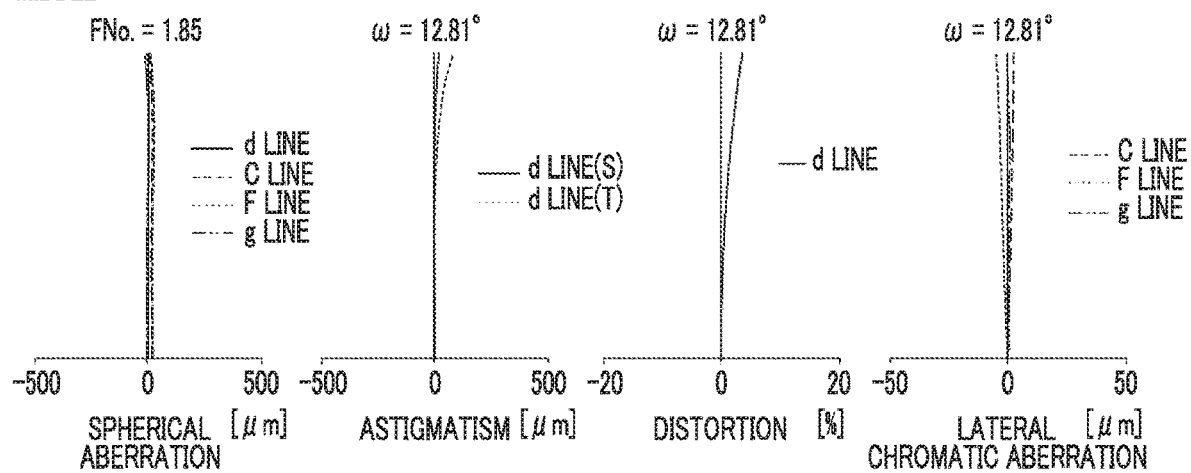
Figure 7:
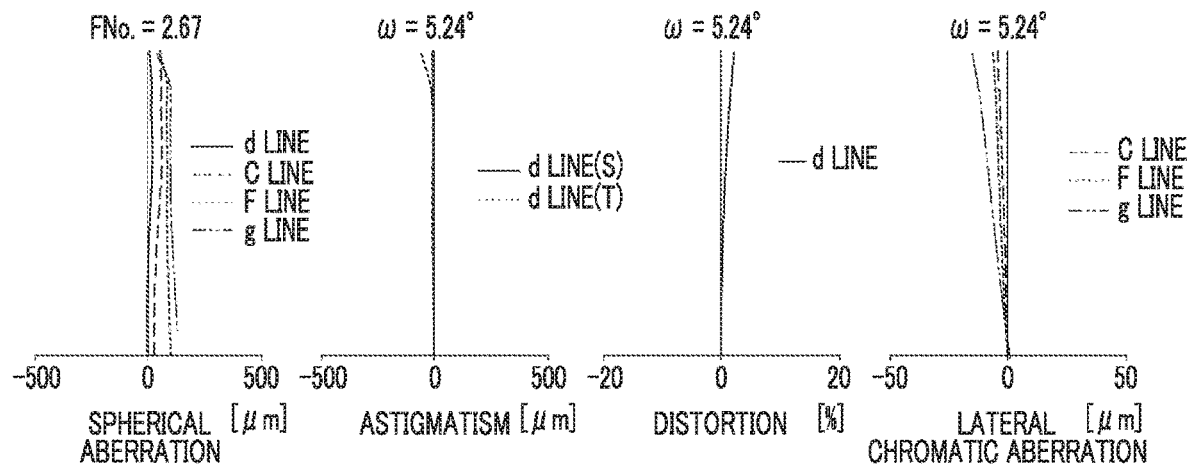

FIG. 7 shows aberration diagrams in a state where an object at infinity is brought into focus through the zoom lens of Example 1. In FIG. 7, in order from the left side, spherical aberration, astigmatism, distortion, and lateral chromatic aberration are shown. In FIG. 7, the upper part labeled by WIDE-ANGLE END shows the zoom lens in the wide-angle end state, the middle part labeled by MIDDLE shows the zoom lens in the middle focal length state, the lower part labeled by TELEPHOTO END shows the zoom lens in the telephoto end state. In the spherical aberration diagram, aberrations at the d line, the C line, the F line, and the g line are indicated by the solid line, the long dashed line, the short dashed line, and the chain double-dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. In the spherical aberration diagram, FNo. indicates an F number. In the other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 3:
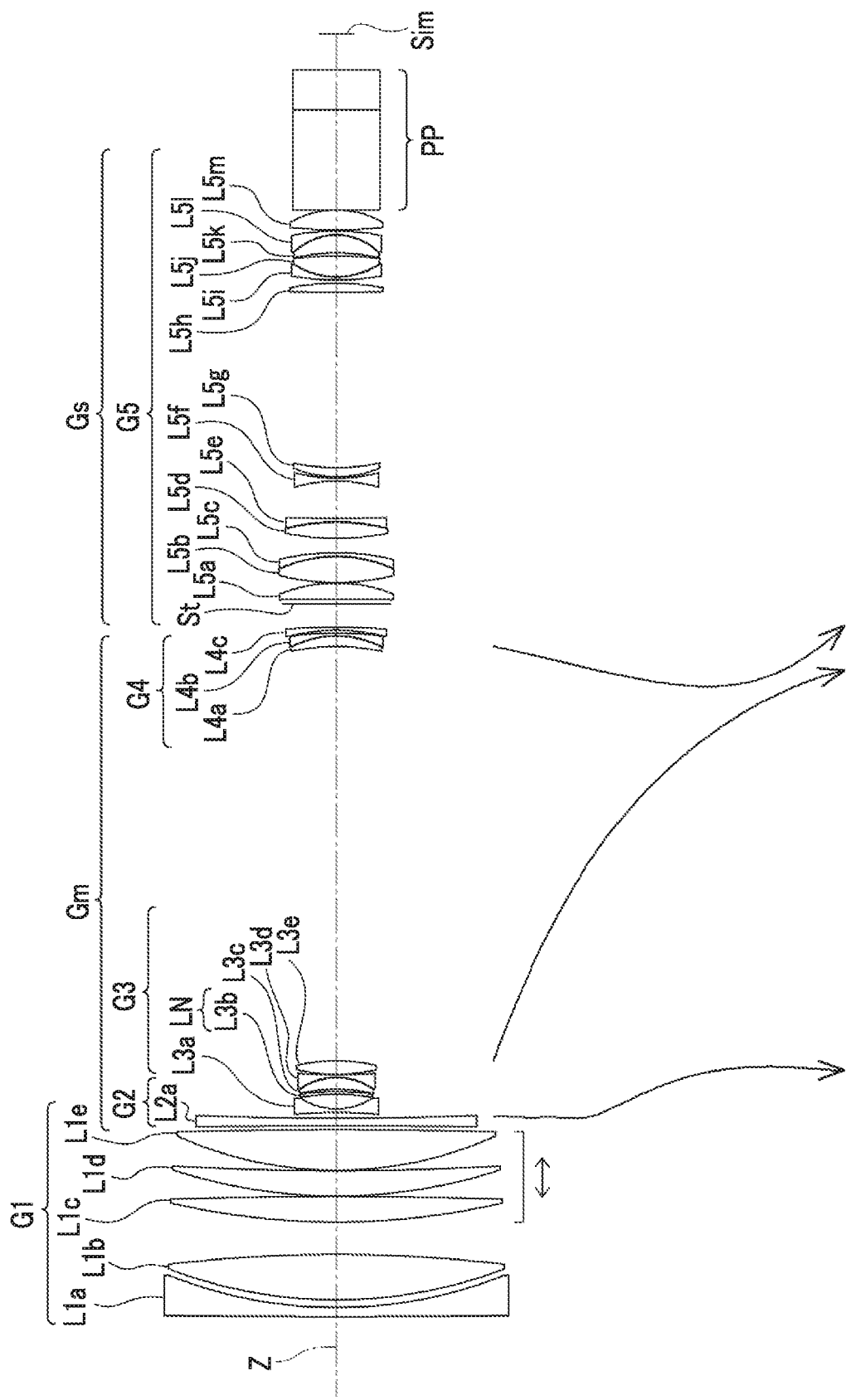
FIG. 3 is a diagram illustrating a cross-sectional view of a configuration of a zoom lens according to Example 2 of the present invention and a movement locus thereof.

FIG. 3 is a cross-sectional diagram illustrating a configuration of the zoom lens of Example 2. The zoom lens of Example 2 consists of, in order from the object side to the image side, a first lens group G1 having a positive refractive power; a second lens group G2 having a negative refractive power; a third lens group G3 having a negative refractive power; a fourth lens group G4 having a negative refractive power; and a fifth lens group G5 having a negative refractive power. The middle group Gm consists of a second lens group G2, a third lens group G3, and a fourth lens group G4. The subsequent group Gs consists of a fifth lens group G5. During zooming, the first lens group G1 and the fifth lens group G5 remain with respect to the image plane Sim, and the second lens group G2, the third lens group G3, and the fourth lens group G4 move along the optical axis Z by changing the distance between lens groups adjacent to each other.

The first lens group G1 consists of five lenses L1a to L1e in order from the object side to the image side. The second lens group G2 consists of one lens L2a. The third lens group G3 consists of five lenses L3a to L3e in order from the object side to the image side. The fourth lens group G4 consists of three lenses L4a to L4c in order from the object side to the image side. The fifth lens group G5 consists of an aperture stop St and thirteen lenses L5a to L5m in order from the object side to the image side. The lens L3b corresponds to the LN lens LN. The focus group consists of lenses L1c to L1e.

Figure 8:
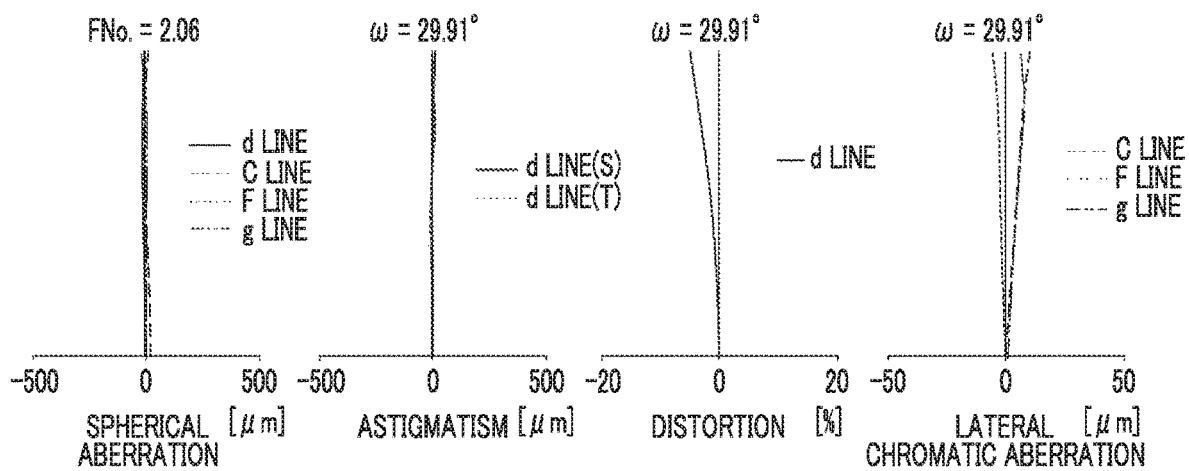
FIG. 8 is a diagram of aberrations of the zoom lens of Example 2 of the present invention.
Figure 8:
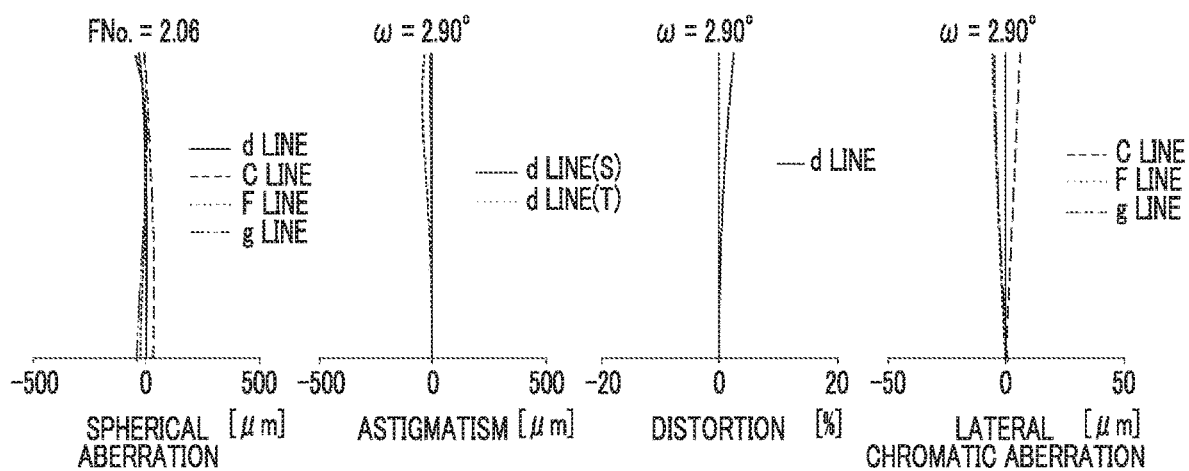
Figure 8:
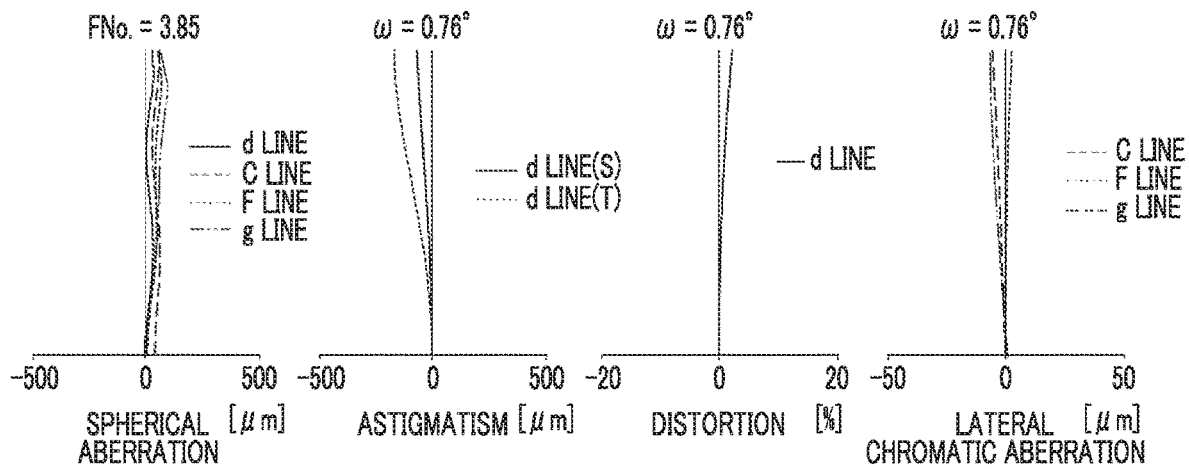

Tables 4A and 4B show basic lens data of the zoom lens of Example 2, Table 5 shows specification and variable surface distances, Table 6 shows aspheric surface coefficients, and FIG. 8 shows aberration diagrams in a state where the object at infinity is in focus.

TABLE 4A

Example 2

| Sn | R | D | Nd | vd | θgF |
|---|---|---|---|---|---|
| 1 | 5602.63981 | 3.000 | 1.80400 | 46.53 | 0.5578 |
| 2 | 156.50042 | 2.491 | | | |
| 3 | 161.56661 | 15.000 | 1.43387 | 95.18 | 0.5373 |
| 4 | −494.65898 | 10.734 | | | |
| 5 | 254.02818 | 8.441 | 1.43387 | 95.18 | 0.5373 |
| 6 | −1596.36762 | 0.120 | | | |
| 7 | 181.16407 | 8.366 | 1.43503 | 95.06 | 0.5365 |
| 8 | 1016.32141 | 0.120 | | | |
| 9 | 133.63070 | 13.433 | 1.43387 | 95.18 | 0.5373 |
| 10 | −1805.13656 | DD[10] | | | |
| 11 | −4033.62138 | 2.550 | 1.53775 | 74.70 | 0.5394 |
| 12 | 1218.32158 | DD[12] | | | |
| *13 | −125.00012 | 1.100 | 1.94456 | 34.70 | 0.5839 |
| 14 | 22.63186 | 4.763 | | | |
| 15 | −81.20318 | 0.960 | 1.77520 | 54.61 | 0.5543 |
| 16 | −91.56724 | 0.844 | | | |
| 17 | −48.17710 | 3.759 | 1.89137 | 20.40 | 0.6393 |
| 18 | −22.33171 | 0.960 | 1.89885 | 36.67 | 0.5792 |
| 19 | 199.75434 | 0.120 | | | |
| 20 | 61.18091 | 4.401 | 1.80895 | 29.00 | 0.6023 |
| 21 | −63.07147 | DD[21] | | | |
| 22 | −73.71221 | 3.440 | 1.89899 | 20.07 | 0.6310 |
| 23 | −34.32030 | 0.960 | 1.90000 | 37.99 | 0.5734 |
| 24 | −115.86534 | 0.973 | | | |
| 25 | −64.19666 | 0.960 | 1.87556 | 41.48 | 0.5662 |
| 26 | −234.49168 | DD[26] | | | |

TABLE 4B

Example 2

| Sn | R | D | Nd | vd | θgF |
|---|---|---|---|---|---|
| 27 (St) | ∞ | 1.671 | | | |
| 28 | −1662.30529 | 5.334 | 1.76385 | 48.49 | 0.5590 |
| 29 | −53.40895 | 0.120 | | | |
| 30 | 78.44936 | 8.677 | 1.66090 | 62.49 | 0.5426 |
| 31 | −47.53906 | 1.200 | 1.91079 | 35.21 | 0.5818 |
| 32 | −85.74047 | 4.781 | | | |
| 33 | 91.16381 | 5.360 | 1.58931 | 69.59 | 0.5407 |
| 34 | −70.24529 | 1.280 | 1.90000 | 20.22 | 0.6306 |
| 35 | 636.76591 | 12.197 | | | |
| 36 | −53.31083 | 1.000 | 1.83473 | 44.49 | 0.5587 |
| 37 | 58.25148 | 0.395 | | | |
| 38 | 37.30208 | 3.087 | 1.89999 | 20.00 | 0.6313 |
| 39 | 69.35698 | 57.584 | | | |
| 40 | 567.67184 | 3.006 | 1.76047 | 27.03 | 0.6065 |
| 41 | −83.27423 | 1.070 | | | |
| 42 | 89.36448 | 1.054 | 1.88185 | 39.80 | 0.5710 |
| 43 | 27.03477 | 6.863 | 1.63365 | 63.66 | 0.5423 |
| 44 | −136.91445 | 1.011 | | | |
| 45 | −65.24557 | 5.942 | 1.48749 | 70.24 | 0.5301 |
| 46 | −20.72072 | 1.314 | 1.83732 | 42.69 | 0.5651 |
| 47 | −76.35609 | 0.320 | | | |
| 48 | 150.81544 | 6.610 | 1.48749 | 70.24 | 0.5301 |
| 49 | −31.84760 | 0.000 | | | |

TABLE 4B-continued

Example 2

| Sn | R | D | Nd | vd | θgF |
|---|---|---|---|---|---|
| 50 | ∞ | 33.000 | 1.60859 | 46.44 | 0.5666 |
| 51 | ∞ | 13.200 | 1.51633 | 64.05 | 0.5346 |
| 52 | ∞ | 11.925 | | | |

TABLE 5

Example 2

| | Wide-Angle End | Middle | Telephoto End |
|---|---|---|---|
| Zr | 1.00 | 10.54 | 40.50 |
| f | 10.059 | 106.043 | 407.392 |
| FNo. | 2.06 | 2.06 | 3.85 |
| 2ω (°) | 59.82 | 5.80 | 1.52 |
| DD[10] | 1.200 | 17.156 | 16.823 |
| DD[12] | 2.000 | 100.197 | 121.037 |
| DD[21] | 136.547 | 8.603 | 8.884 |
| DD[26] | 7.576 | 21.367 | 0.579 |

TABLE 6

Example 2

| | Sn 13 |
|---|---|
| KA | 1.0000000E+00 |
| A4 | 3.5830376E−06 |
| A6 | 6.3192990E−08 |
| A8 | −2.1933635E−09 |
| A10 | 4.2082595E−11 |
| A12 | −5.0799726−13 |
| A14 | 3.8672311E−15 |
| A16 | −1.7902791E−17 |
| A18 | 4.5886787E−20 |
| A20 | −4.9871907E−23 |

Example 3

Figure 4:
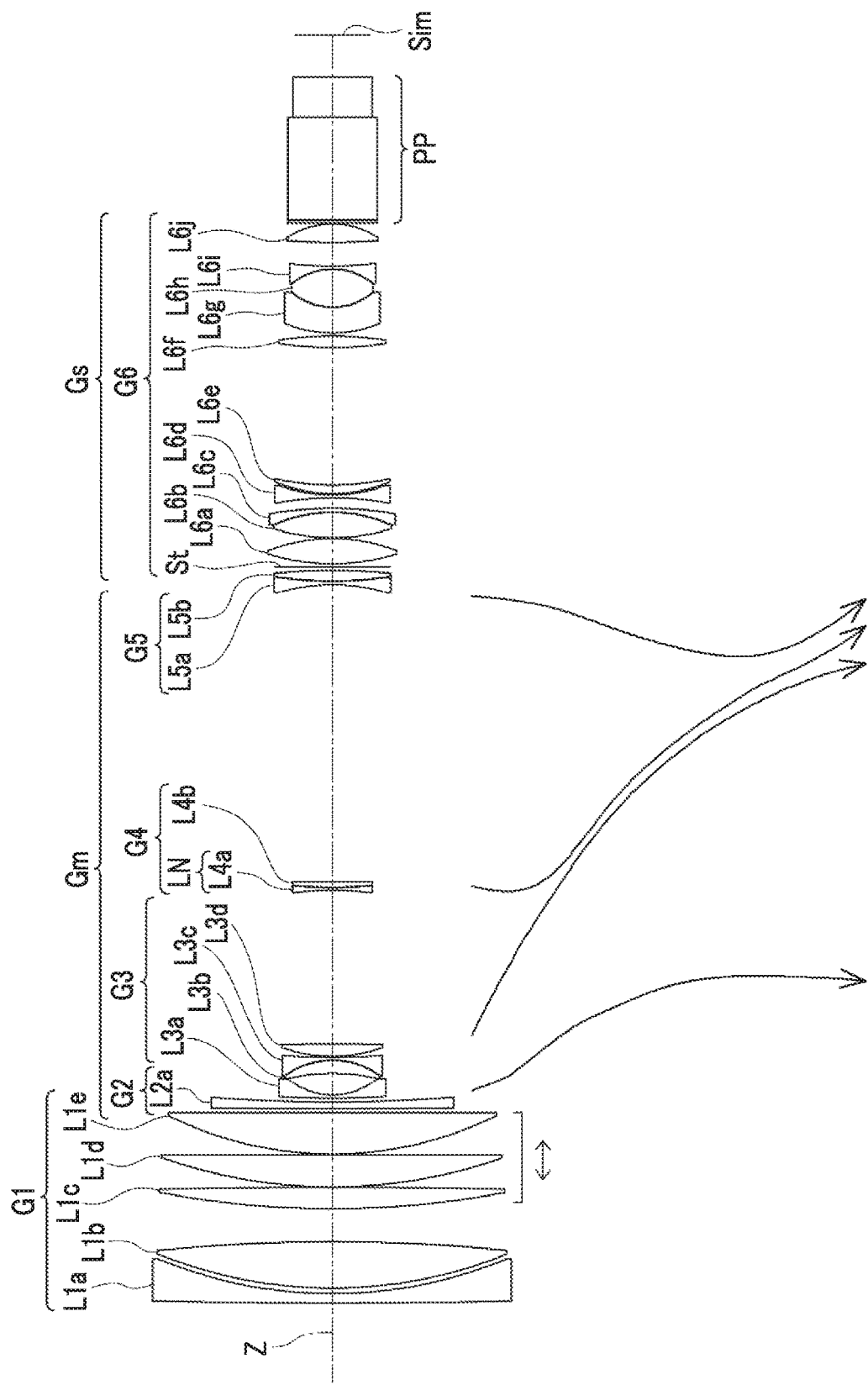
FIG. 4 is a diagram illustrating a cross-sectional view of a configuration of a zoom lens according to Example 3 of the present invention and a movement locus thereof.

FIG. 4 is a cross-sectional diagram illustrating a configuration of the zoom lens of Example 3. The zoom lens of Example 3 consists of, in order from the object side to the image side, a first lens group G1 having a positive refractive power; a second lens group G2 having a negative refractive power; a third lens group G3 having a negative refractive power; a fourth lens group G4 having a negative refractive power; a fifth lens group G5 having a negative refractive power; and a sixth lens group G6 having a positive refractive power. The middle group Gm consists of a second lens group G2, a third lens group G3, a fourth lens group G4, and a fifth lens group G5. The subsequent group Gs consists of a sixth lens group G6. During zooming, the first lens group G1 and the sixth lens group G6 remain with respect to the image plane Sim, and the second lens group G2, the third lens group G3, the fourth lens group G4, and the fifth lens group G5 move along the optical axis Z by changing the distance between lens groups adjacent to each other.

The first lens group G1 consists of five lenses L1a to L1e in order from the object side to the image side. The second lens group G2 consists of one lens L2a. The third lens group G3 consists of four lenses L3a to L3d in order from the object side to the image side. The fourth lens group G4 consists of two lenses L4a and L4b in order from the object side to the image side. The fifth lens group G5 consists of two lenses L5a and L5b in order from the object side to the image side. The sixth lens group G6 consists of an aperture stop St and ten lenses L6a to L6j in order from the object side to the image side. The lens L4a corresponds to the LN lens LN. The focus group consists of lenses L1c to L1e.

Figure 9:
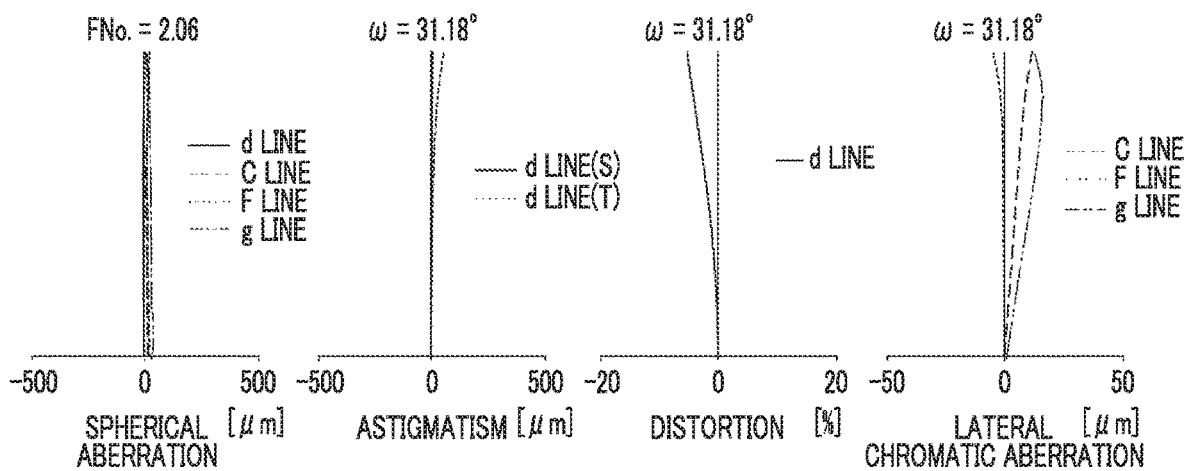
FIG. 9 is a diagram of aberrations of the zoom lens of Example 3 of the present invention.
Figure 9:
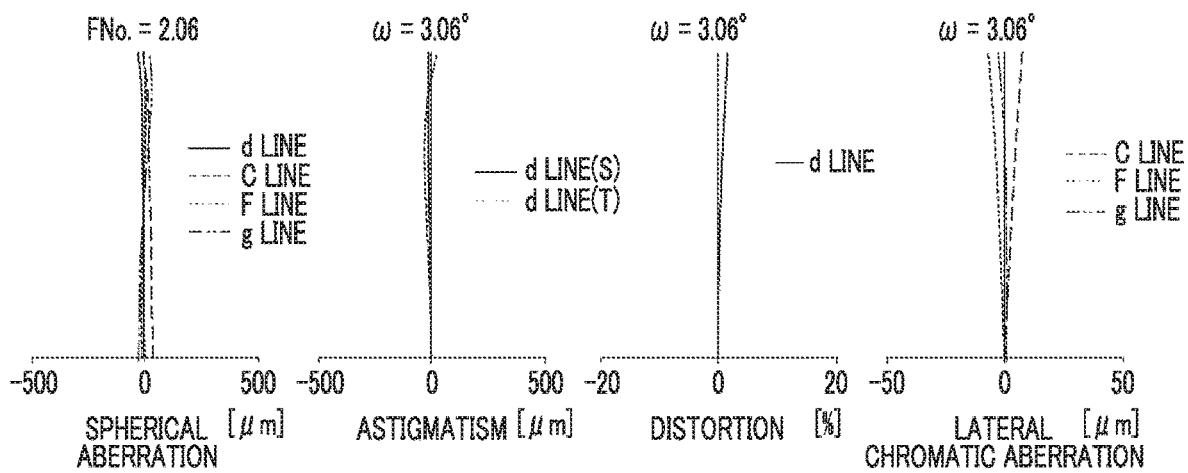
Figure 9:
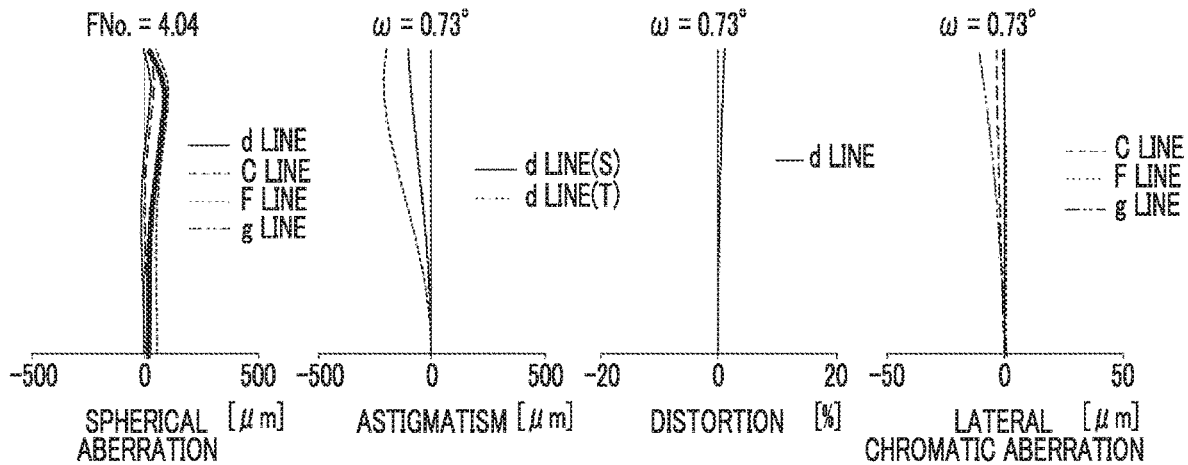

Table 7 shows basic lens data of the zoom lens of Example 3, Table 8 shows specification and variable surface distances, Table 9 shows aspheric surface coefficients, and FIG. 9 shows aberration diagrams in a state where the object at infinity is in focus.

TABLE 7

Example 3

| Sn | R | D | Nd | vd | θgF |
|---|---|---|---|---|---|
| 1 | 2758.42359 | 2.980 | 1.80400 | 46.53 | 0.5578 |
| 2 | 152.67265 | 1.787 | | | |
| 3 | 155.78881 | 15.000 | 1.43387 | 95.18 | 0.5373 |
| 4 | −579.43924 | 10.554 | | | |
| 5 | 311.40157 | 6.877 | 1.43700 | 95.10 | 0.5336 |
| 6 | −2543.96177 | 0.120 | | | |
| 7 | 172.37716 | 10.400 | 1.43387 | 95.18 | 0.5373 |
| 8 | ∞ | 0.120 | | | |
| 9 | 123.68284 | 13.410 | 1.43387 | 95.18 | 0.5373 |
| 10 | ∞ | DD[10] | | | |
| 11 | 2719.51051 | 2.270 | 1.55032 | 75.50 | 0.5400 |
| 12 | 526.89880 | DD[12] | | | |
| 13 | 242.77714 | 1.050 | 2.00100 | 29.13 | 0.5995 |
| 14 | 23.20915 | 7.158 | | | |
| 15 | −62.97680 | 4.200 | 1.89286 | 20.36 | 0.6394 |
| 16 | −27.16300 | 1.010 | 1.89190 | 37.13 | 0.5781 |
| 17 | 262.01725 | 0.300 | | | |
| 18 | 50.90026 | 3.904 | 1.92286 | 20.88 | 0.6390 |
| 19 | −1873.94860 | DD[19] | | | |
| 20 | −88.84343 | 0.910 | 1.76385 | 48.49 | 0.5590 |
| 21 | 157.11400 | 1.600 | 1.92286 | 20.88 | 0.6390 |
| 22 | 1415.06905 | DD[22] | | | |
| 23 | −64.30288 | 1.180 | 1.90043 | 37.37 | 0.5767 |
| 24 | 124.49000 | 3.410 | 1.89286 | 20.36 | 0.6394 |
| 25 | −223.30610 | DD[25] | | | |
| 26 (St) | ∞ | 1.000 | | | |
| 27 | 73.95141 | 8.154 | 1.76385 | 48.49 | 0.5590 |
| *28 | −55.93924 | 0.171 | | | |
| 29 | 65.49849 | 8.290 | 1.43875 | 94.66 | 0.5340 |
| 30 | −47.73600 | 1.240 | 1.95906 | 17.47 | 0.6599 |
| 31 | −128.25888 | 3.375 | | | |
| *32 | −100.54918 | 1.000 | 1.80610 | 40.93 | 0.5702 |
| 33 | 53.98672 | 0.399 | | | |
| 34 | 49.88468 | 2.736 | 1.95906 | 17.47 | 0.6599 |
| 35 | 89.66151 | 44.161 | | | |
| 36 | 118.02446 | 3.680 | 1.85478 | 24.80 | 0.6123 |
| 37 | −118.02446 | 1.019 | | | |
| 38 | 41.73080 | 8.310 | 2.00100 | 29.13 | 0.5995 |
| 39 | 21.41900 | 12.300 | 1.48749 | 70.24 | 0.5301 |
| 40 | −21.41900 | 0.980 | 1.91082 | 35.25 | 0.5822 |
| 41 | 116.06433 | 7.692 | | | |
| 42 | 269.35684 | 5.898 | 1.56883 | 56.04 | 0.5485 |
| 43 | −27.85993 | 0.200 | | | |
| 44 | ∞ | 1.000 | 1.51633 | 64.14 | 0.5353 |
| 45 | ∞ | 33.000 | 1.60859 | 46.44 | 0.5666 |
| 46 | ∞ | 13.200 | 1.51633 | 64.05 | 0.5346 |
| 47 | ∞ | 13.497 | | | |

TABLE 8

Example 3

| | Wide-Angle End | Middle | Telephoto End |
|---|---|---|---|
| Zr | 1.00 | 10.54 | 44.34 |
| f | 9.603 | 101.230 | 425.814 |
| FNo. | 2.06 | 2.06 | 4.04 |
| 2ω (°) | 62.36 | 6.12 | 1.46 |
| DD[10] | 1.200 | 40.215 | 38.966 |
| DD[12] | 1.200 | 69.899 | 92.346 |

TABLE 8-continued

Example 3

| | Wide-Angle End | Middle | Telephoto End |
|---|---|---|---|
| DD[19] | 49.285 | 2.025 | 10.563 |
| DD[22] | 96.090 | 15.175 | 5.023 |
| DD[25] | 1.198 | 21.660 | 2.075 |

TABLE 9

Example 3

| | Sn | |
|---|---|---|
| | 28 | 32 |
| KA | 1.0000000E+00 | 1.0000000E+00 |
| A4 | 12726760E−06 | 4.7415505E−07 |
| A6 | 3.6654463E−09 | 6.5877762E−09 |
| A8 | −3.2814800E−11 | −6.9216211E−11 |
| A10 | 1.9124227E−13 | 4.3338142E−13 |
| A12 | −8.0478127E−16 | −1.9572115E−15 |
| A14 | 2.3664959E−18 | 6.5784048E−18 |
| A16 | −4.5218264E−21 | −1.5503257E−20 |
| A18 | 4.9870538E−24 | 2.2423809E−23 |
| A20 | −2.3905900E−27 | −1.4628348E−26 |

Example 4

Figure 5:
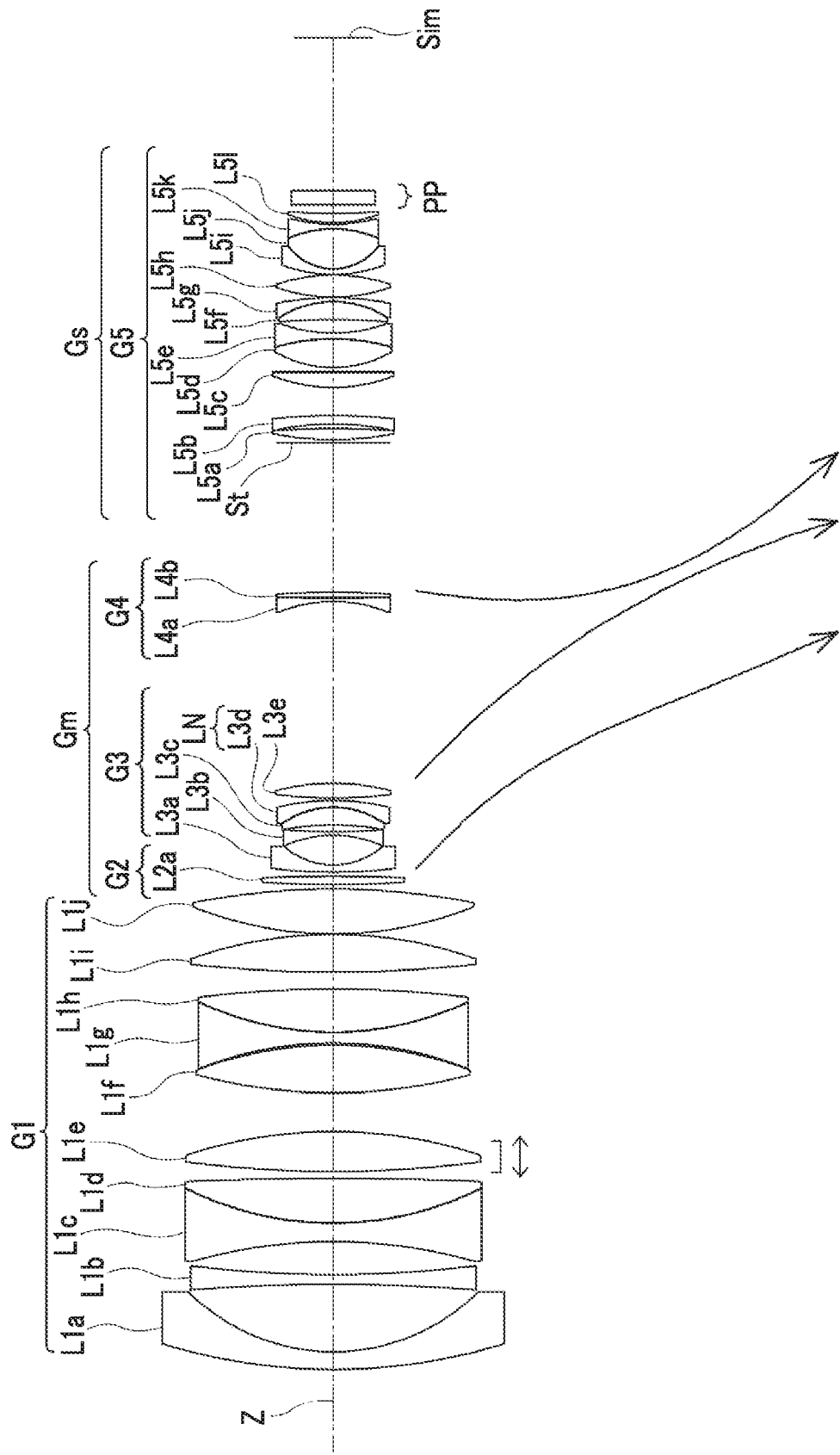
FIG. 5 is a diagram illustrating a cross-sectional view of a configuration of a zoom lens according to Example 4 of the present invention and a movement locus thereof.

FIG. 5 is a cross-sectional diagram illustrating a configuration of the zoom lens of Example 4. The zoom lens of Example 4 consists of, in order from the object side to the image side, a first lens group G1 having a positive refractive power; a second lens group G2 having a positive refractive power; a third lens group G3 having a negative refractive power; a fourth lens group G4 having a negative refractive power; and a fifth lens group G5 having a positive refractive power. The middle group Gm consists of a second lens group G2, a third lens group G3, and a fourth lens group G4. The subsequent group Gs consists of a fifth lens group G5. During zooming, the first lens group G1 and the fifth lens group G5 remain with respect to the image plane Sim, and the second lens group G2, the third lens group G3, and the fourth lens group G4 move along the optical axis Z by changing the distance between lens groups adjacent to each other.

The first lens group G1 consists of ten lenses L1a to L1j in order from the object side to the image side. The second lens group G2 consists of one lens L2a. The third lens group G3 consists of five lenses L3a to L3e in order from the object side to the image side. The fourth lens group G4 consists of two lenses L4a and L4b in order from the object side to the image side. The fifth lens group G5 consists of an aperture stop St and twelve lenses L5a to L5l in order from the object side to the image side. The lens L3d corresponds to the LN lens LN. The focus group consists of the lens L1e.

Figure 10:
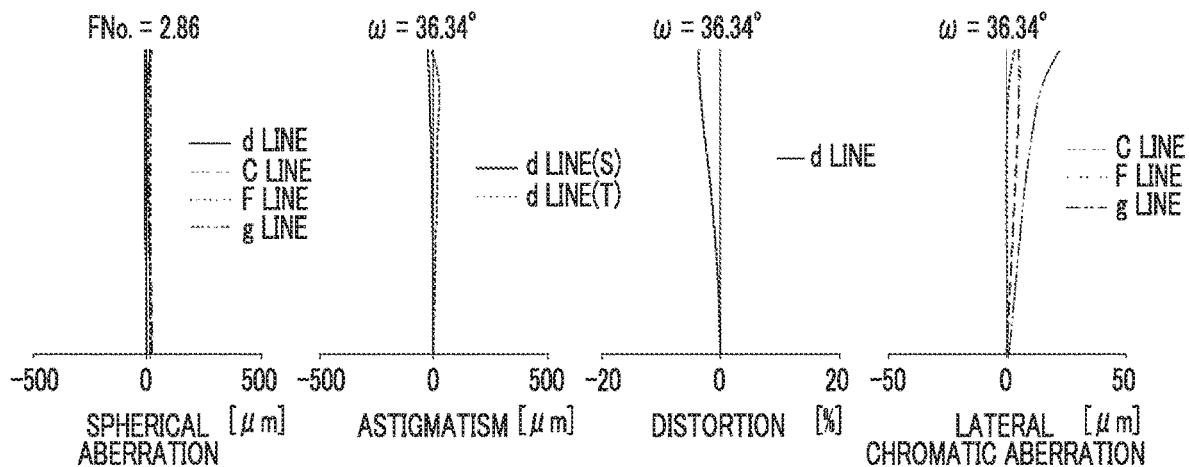
FIG. 10 is a diagram of aberrations of the zoom lens of Example 4 of the present invention.
Figure 10:
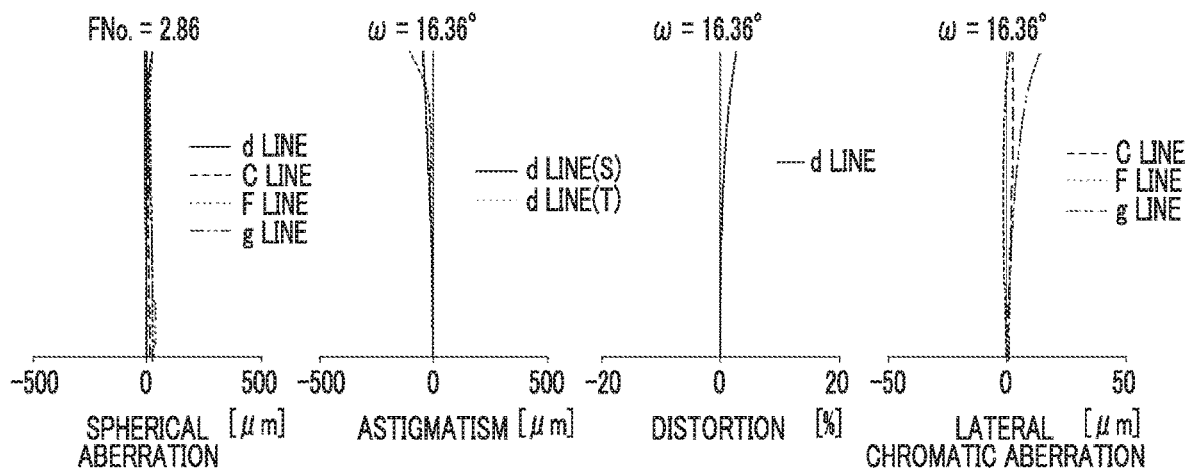
Figure 10:
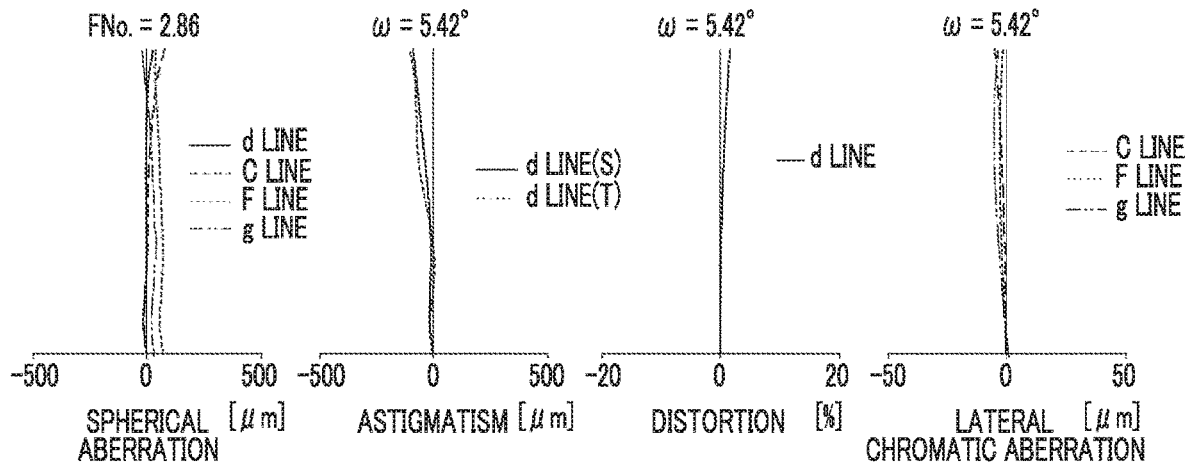

Tables 10A and 10B show basic lens data of the zoom lens of Example 4, Table 11 shows specification and variable surface distances, Table 12 shows aspheric surface coefficients, and FIG. 10 shows aberration diagrams in a state where the object at infinity is in focus.

TABLE 10A

Example 4

| Sn | R | D | Nd | vd | θgF |
|---|---|---|---|---|---|
| 1 | 212.64499 | 6.254 | 1.88300 | 40.76 | 0.5668 |
| 2 | 74.86592 | 23.869 | | | |
| 3 | −627.85865 | 3.300 | 1.73400 | 51.47 | 0.5487 |
| 4 | 415.23299 | 11.658 | | | |
| 5 | −188.89629 | 6.507 | 1.53775 | 74.70 | 0.5394 |
| 6 | 120.98980 | 15.785 | 1.91650 | 31.60 | 0.5912 |
| 7 | −1261.04953 | 2.372 | | | |
| *8 | 341.42320 | 14.141 | 1.43875 | 94.94 | 0.5343 |
| 9 | −172.58167 | 13.476 | | | |
| 10 | 196.27510 | 16.727 | 1.49700 | 81.54 | 0.5375 |
| 11 | −142.13691 | 0.746 | | | |
| 12 | −133.96197 | 3.835 | 1.85150 | 40.78 | 0.5696 |
| 13 | 115.40048 | 15.239 | 1.49700 | 81.54 | 0.5375 |
| 14 | −398.54695 | 5.967 | | | |
| 15 | 476.04931 | 13.278 | 1.53775 | 74.70 | 0.5394 |
| 16 | −156.68439 | 0.200 | | | |
| 17 | 138.72598 | 15.823 | 1.49700 | 81.54 | 0.5375 |
| 18 | −263.84403 | DD[18] | | | |
| 19 | 366.99360 | 2.977 | 1.49700 | 81.54 | 0.5375 |
| 20 | −561.66067 | DD[20] | | | |
| *21 | 226.22641 | 2.545 | 1.53775 | 74.70 | 0.5394 |
| 22 | 27.32961 | 10.437 | | | |
| 23 | −42.81716 | 1.200 | 2.00100 | 29.13 | 0.5995 |
| 24 | 205.22485 | 2.383 | | | |
| 25 | −107.19469 | 6.281 | 1.76182 | 26.52 | 0.6136 |
| 26 | −32.33119 | 2.429 | 1.76385 | 48.49 | 0.5590 |
| 27 | −82.93832 | 0.830 | | | |
| 28 | 164.41669 | 5.230 | 1.83481 | 42.72 | 0.5649 |
| 29 | −80.33728 | DD[29] | | | |
| 30 | −52.83733 | 1.310 | 1.49700 | 81.54 | 0.5375 |
| 31 | 1463.88443 | 1.966 | 1.84666 | 23.83 | 0.6160 |
| 32 | −302.51705 | DD[32] | | | |

TABLE 10B

Example 4

| Sn | R | D | Nd | vd | θgF |
|---|---|---|---|---|---|
| 33 (St) | ∞ | 1.167 | | | |
| 34 | 118.97527 | 3.830 | 1.91082 | 35.25 | 0.5822 |
| 35 | −331.85890 | 1.578 | | | |
| 36 | −104.55957 | 3.000 | 1.76182 | 26.52 | 0.6136 |
| 37 | −211.28070 | 9.936 | | | |
| 38 | 60.09505 | 5.271 | 1.65844 | 50.88 | 0.5561 |
| 39 | ∞ | 1.417 | | | |
| 40 | 42.26187 | 10.113 | 1.43875 | 94.94 | 0.5343 |
| 41 | −78.18443 | 2.059 | 1.95375 | 32.32 | 0.5901 |
| 42 | 56.33405 | 4.832 | | | |
| 43 | −226.33060 | 6.273 | 1.80518 | 25.43 | 0.6103 |
| 44 | −36.25955 | 1.410 | 1.80400 | 46.58 | 0.5573 |
| 45 | −107.11379 | 0.200 | | | |
| 46 | 64.21220 | 7.806 | 1.48749 | 70.24 | 0.5301 |
| 47 | −64.21220 | 0.200 | | | |
| 48 | 53.82475 | 1.973 | 1.91082 | 35.25 | 0.5822 |
| 49 | 20.50244 | 14.037 | 1.49700 | 81.54 | 0.5375 |
| 50 | −41.82031 | 1.601 | 1.90043 | 37.37 | 0.5772 |
| 51 | 57.48527 | 0.615 | | | |
| 52 | 48.65119 | 3.313 | 1.84666 | 23.83 | 0.6160 |
| 53 | 240.54111 | 3.000 | | | |
| 54 | ∞ | 5.090 | 1.51633 | 64.14 | 0.5353 |
| 55 | ∞ | 53.873 | | | |

TABLE 11

Example 4

| | Wide-Angle End | Middle | Telephoto End |
|---|---|---|---|
| Zr | 1.00 | 2.35 | 7.35 |
| f | 19.904 | 46.795 | 146.298 |
| FNo. | 2.86 | 2.86 | 2.86 |
| 2ω (°) | 72.68 | 32.72 | 10.84 |
| DD[18] | 1.500 | 50.247 | 86.698 |
| DD[20] | 1.493 | 6.843 | 8.752 |
| DD[29] | 64.090 | 9.416 | 21.406 |
| DD[32] | 52.724 | 53.301 | 2.952 |

TABLE 12

Example 4

| | Sn 8 |
|---|---|
| KA | 1.0000000E+00 |
| A3 | 1.5064530E−07 |
| A4 | −1.5641141E−07 |
| A5 | 1.6501598E−09 |
| A6 | −3.9701428E−11 |
| A7 | 6.9263338E−13 |
| A8 | 1.0556630E−17 |
| A9 | −7.0509369E−17 |
| A10 | 5.3287613E−19 |

| | Sn 21 |
|---|---|
| KA | 1.0000000E+00 |
| A4 | 1.5045420E−06 |
| A6 | −4.1679388E−10 |
| A8 | −8.9800509E−12 |
| A10 | 7.0993908E−14 |
| A12 | −3.2299521E−16 |
| A14 | 8.7823289E−19 |
| A16 | −1.4036759E−21 |
| A18 | 1.2097861E−24 |
| A20 | −4.3023907E−28 |

Example 5

Figure 6:
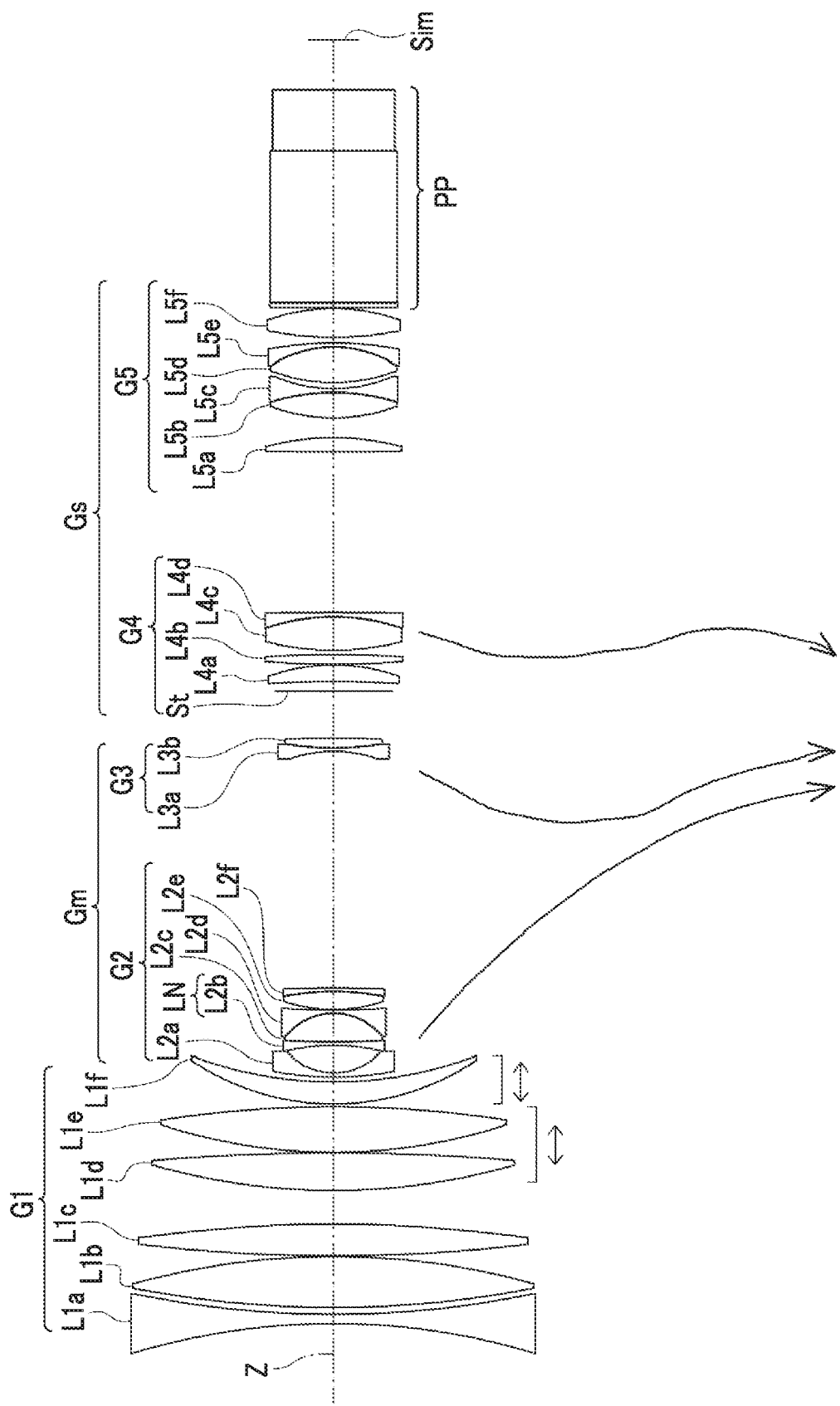
FIG. 6 is a diagram illustrating a cross-sectional view of a configuration of a zoom lens according to Example 5 of the present invention and a movement locus thereof.

FIG. 6 is a cross-sectional diagram illustrating a configuration of the zoom lens of Example 5. The zoom lens of Example 5 consists of, in order from the object side to the image side, a first lens group G1 having a positive refractive power; a second lens group G2 having a negative refractive power; a third lens group G3 having a negative refractive power; a fourth lens group G4 having a positive refractive power; and a fifth lens group G5 having a positive refractive power. The middle group Gm consists of a second lens group G2 and a third lens group G3. The subsequent group Gs consists of a fourth lens group G4 and a fifth lens group G5. During zooming, the first lens group G1 and the fifth lens group G5 remain with respect to the image plane Sim, and the second lens group G2, the third lens group G3, and the fourth lens group G4 move along the optical axis Z by changing the distance between lens groups adjacent to each other.

The first lens group G1 consists of six lenses L1a to L1f in order from the object side to the image side. The second lens group G2 consists of six lenses L2a to L2f in order from the object side to the image side. The third lens group G3 consists of two lenses L3a and L3b in order from the object side to the image side. The fourth lens group G4 consists of an aperture stop St and four lenses L4a to L4d in order from the object side to the image side. The fifth lens group G5 consists of six lenses L5a to L5f in order from the object side to the image side. The lens L2b corresponds to the LN lens LN. The first focus group consists of the lenses L1d to L1e, and the second focus group consists of the lens L1f. During focusing, the first focus group and the second focus group move along the optical axis Z with different loci from each other.

Figure 11:
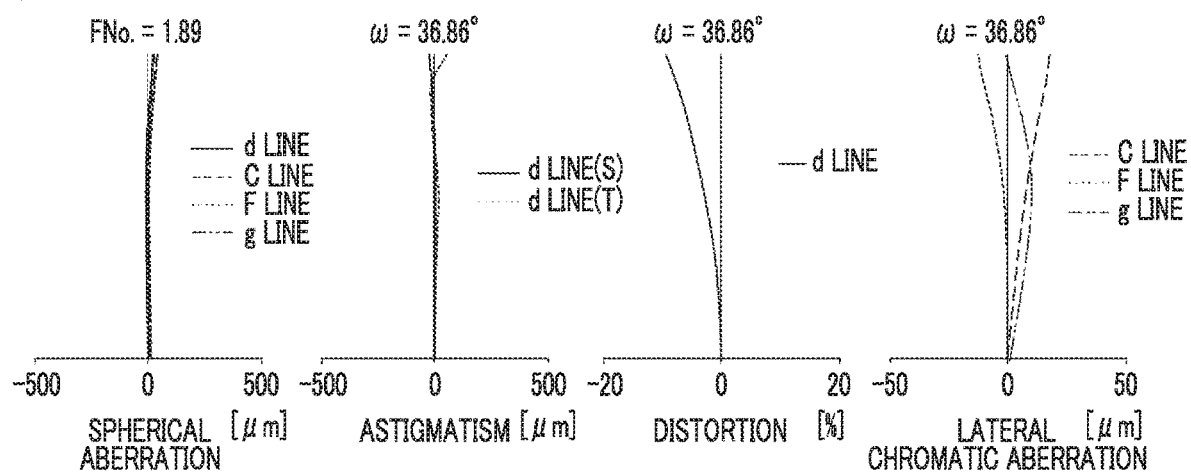
FIG. 11 is a diagram of aberrations of the zoom lens of Example 5 of the present invention.
Figure 11:
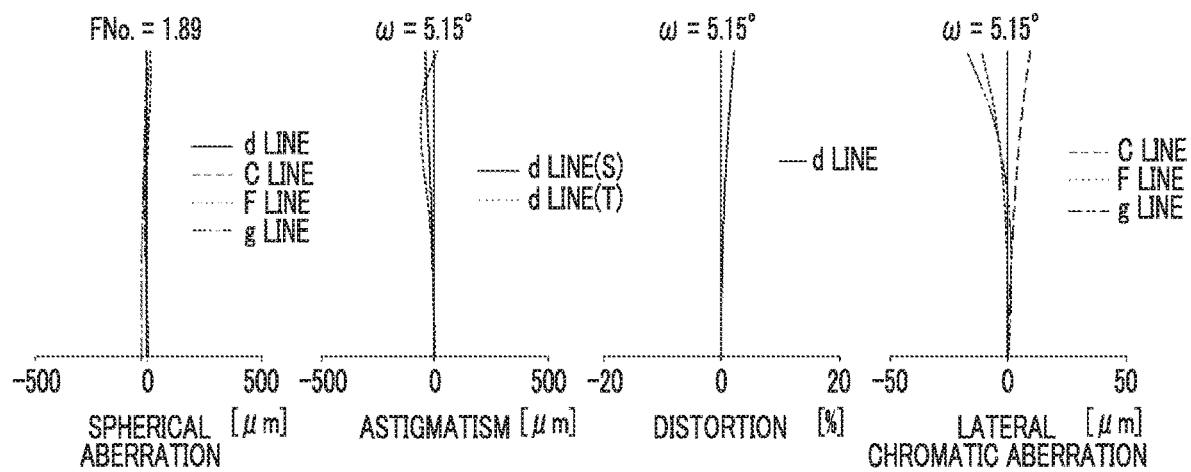
Figure 11:
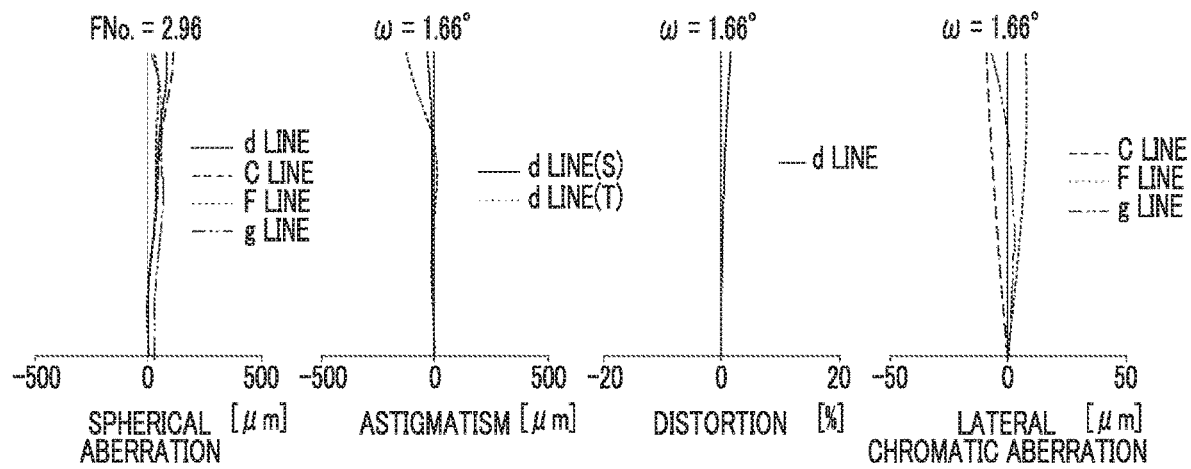

Table 13 shows basic lens data of the zoom lens of Example 5, Table 14 shows specification and variable surface distances, Table 15 shows aspheric surface coefficients, and FIG. 11 shows aberration diagrams in a state where the object at infinity is in focus.

TABLE 13

Example 5

| Sn | R | D | Nd | vd | θgF |
|---|---|---|---|---|---|
| 1 | −156.56421 | 2.000 | 1.80610 | 33.27 | 0.5885 |
| 2 | 221.88779 | 1.481 | | | |
| 3 | 237.53179 | 11.070 | 1.43387 | 95.18 | 0.5373 |
| 4 | −168.43113 | 0.120 | | | |
| 5 | 373.95224 | 6.920 | 1.43700 | 95.10 | 0.5336 |
| *6 | −275.48580 | 7.246 | | | |
| 7 | 148.64138 | 8.140 | 1.43387 | 95.18 | 0.5373 |
| 8 | −485.06373 | 0.120 | | | |
| 9 | 125.26147 | 9.870 | 1.43700 | 95.10 | 0.5336 |
| 10 | −257.81028 | 0.600 | | | |
| 11 | 57.60531 | 4.790 | 1.76385 | 48.49 | 0.5590 |
| 12 | 91.88531 | DD[12] | | | |
| *13 | 79.37067 | 0.900 | 2.00099 | 28.39 | 0.6018 |
| 14 | 14.28492 | 5.866 | | | |
| 15 | −44.16134 | 0.710 | 1.79600 | 45.42 | 0.5726 |
| 16 | 179.98246 | 6.183 | 1.91379 | 19.31 | 0.6467 |
| 17 | −13.95471 | 0.700 | 2.00001 | 28.00 | 0.6031 |
| 18 | 175.18740 | 0.120 | | | |
| 19 | 35.61909 | 3.892 | 1.67780 | 31.59 | 0.6002 |
| 20 | −58.67291 | 0.730 | 1.80591 | 47.41 | 0.5559 |
| 21 | −337.80693 | DD[21] | | | |
| 22 | −29.80390 | 0.750 | 1.92480 | 35.52 | 0.5818 |
| 23 | 65.12147 | 2.161 | 2.00000 | 17.11 | 0.6644 |
| 24 | −179.08021 | DD[24] | | | |
| 25 (St) | ∞ | 2.111 | | | |
| 26 | −223.75130 | 3.599 | 1.79304 | 48.70 | 0.5534 |
| 27 | −43.84467 | 0.120 | | | |
| 28 | 180.60224 | 2.111 | 1.78332 | 49.67 | 0.5516 |
| 29 | −249.99472 | 0.948 | | | |
| 30 | 61.25346 | 7.261 | 1.51000 | 63.83 | 0.5353 |
| 31 | −47.11201 | 0.920 | 1.94355 | 33.64 | 0.5866 |
| 32 | −872.08930 | DD[32] | | | |
| 33 | 844.60059 | 3.080 | 1.73800 | 32.33 | 0.5900 |
| 34 | −59.18665 | 4.322 | | | |
| 35 | 41.48104 | 5.440 | 1.48749 | 70.24 | 0.5301 |
| 36 | −49.50700 | 0.860 | 1.95375 | 32.32 | 0.5901 |
| 37 | 33.85248 | 1.342 | | | |
| 38 | 40.17043 | 7.500 | 1.53775 | 74.70 | 0.5394 |
| 39 | −26.65900 | 0.880 | 1.87070 | 40.73 | 0.5683 |
| 40 | −80.58184 | 1.244 | | | |
| 41 | 76.68452 | 6.239 | 1.58144 | 40.75 | 0.5776 |
| 42 | −43.96715 | 0.200 | | | |
| 43 | ∞ | 1.000 | 1.52780 | 58.67 | 0.5539 |
| 44 | ∞ | 33.000 | 1.60859 | 46.44 | 0.5666 |
| 45 | ∞ | 13.200 | 1.51633 | 64.05 | 0.5346 |
| 46 | ∞ | 10.787 | | | |

TABLE 14

Example 5

| | Wide-Angle End | Middle | Telephoto End |
|---|---|---|---|
| Zr | 1.00 | 7.38 | 23.11 |
| f | 8.095 | 59.739 | 187.068 |
| FNo. | 1.89 | 1.89 | 2.96 |
| 2ω (°) | 73.72 | 10.30 | 3.32 |
| DD[12] | 1.036 | 44.031 | 52.380 |
| DD[21] | 51.312 | 2.948 | 3.066 |
| DD[24] | 10.099 | 14.288 | 1.393 |
| DD[32] | 34.796 | 35.976 | 40.405 |

TABLE 15

Example 5

| | Sn | |
|---|---|---|
| | 6 | 13 |
| KA | 1.0000000E+00 | 1∞∞∞OE+00 |
| A4 | 1.0052940E−07 | 4.8215119E−06 |
| A6 | 5.1522150E−11 | −2.3555604E−08 |
| A8 | −1.7490134E−13 | 6.0363095−10 |
| A10 | 3.7973078E−16 | −1.7467297−11 |
| A12 | −4.8615002E−19 | 3.4205709E−13 |
| A14 | 3.8280238E−22 | −3.8657172E−15 |
| A16 | −1.8028238E−25 | 2.4362214E−17 |
| A18 | 4.5969112E−29 | −7.9834448E−20 |
| A20 | −4.7850097E−33 | 1.0600242E−22 |

Table 16 shows values corresponding to Conditional Expressions (1) to (7) of the zoom lenses of Examples 1 to 5. Examples 1 to 5 are based on the d line. Table 16 shows the values on the d line basis.

TABLE 16

| Expression Number | | Example 1 | Example 2 | Example 3 | Example 4 | Example 5 |
|---|---|---|---|---|---|---|
| (1) | Ndn | 1.72900 | 1.77520 | 1.76385 | 1.76385 | 1.79600 |
| (2) | vdn | 49.12 | 54.61 | 48.49 | 48.49 | 45.42 |
| (3) | θgFn + 0.001625 × vdn | 0.6372 | 0.6430 | 0.6378 | 0.6378 | 0.6464 |
| (4) | Ndn + 0.01 × vdn | 2.220 | 2.321 | 2.249 | 2.249 | 2.250 |
| (5) | fB/fA | 3.74 | 2.83 | 0.83 | 2.92 | 2.81 |
| (6) | fLNm/fA | 3.9 | 39.3 | 0.6 | 1.3 | 3.0 |
| (7) | vdcn − vdcp | 28.76 | — | 27.61 | 21.97 | 26.11 |

As can be seen from the above data, the zoom lenses of Examples 1 to 5 each are miniaturized, have high magnification which is a magnification of 7 or more, and have high optical performance by suppressing fluctuation in chromatic aberration and fluctuation in spherical aberration during zooming and satisfactorily correcting various aberrations.

Figure 12:
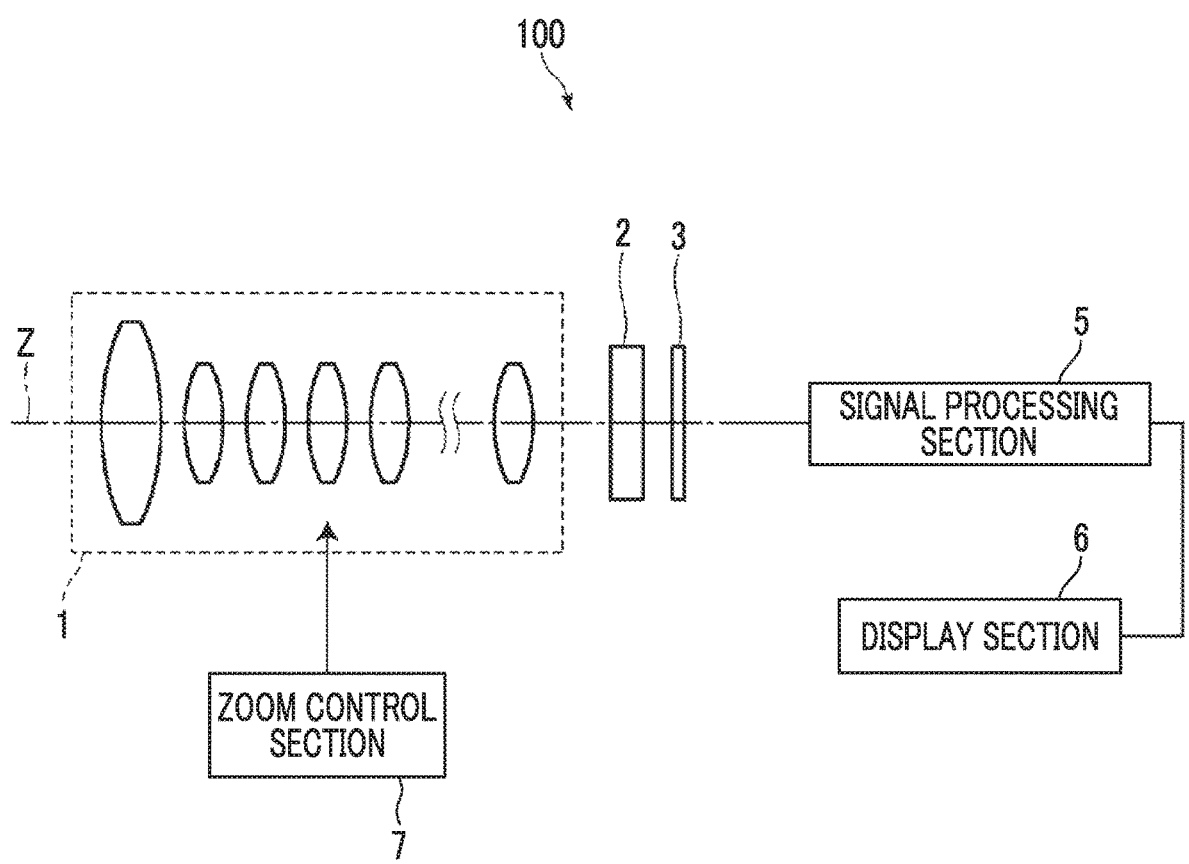
FIG. 12 is a schematic configuration diagram of an imaging apparatus according to an embodiment of the present invention.

Next, an imaging apparatus according to an embodiment of the present invention will be described. FIG. 12 is a schematic configuration diagram of an imaging apparatus 100 using the zoom lens 1 according to the above-mentioned embodiment of the present invention as an example of an imaging apparatus of an embodiment of the present invention. Examples of the imaging apparatus 100 include a broadcast camera, a movie imaging camera, a video camera, a surveillance camera, and the like.

The imaging apparatus 100 comprises a zoom lens 1, a filter 2 which is disposed on the image side of the zoom lens 1, and an imaging element 3 which is disposed on the image side of the filter 2. FIG. 12 schematically show a plurality of lenses provided in the zoom lens 1.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with the image plane of the zoom lens 1.

The imaging apparatus 100 also comprises a signal processing section 5 which performs calculation processing on an output signal from the imaging element 3, a display section 6 which displays an image formed by the signal processing section 5, and a zoom control section 7 which controls zooming of the zoom lens 1. Although only one imaging element 3 is shown in FIG. 12, a so-called three-plate imaging apparatus having three imaging elements may be used.

The technology of the present invention has been hitherto described through embodiments and examples, but the technology of the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:

1. A zoom lens consisting of, in order from an object side to an image side:
a first lens group that remains stationary with respect to an image plane during zooming and has a positive refractive power;
a middle group that consists of two or more movable lens groups moving along an optical axis by changing a distance between groups adjacent to each other during zooming; and
a subsequent group that has a lens group including a stop at a position closest to the object side,
wherein at least two movable lens groups in the middle group each have a negative refractive power,
wherein the at least one movable lens group having the negative refractive power in the middle group includes at least one LN lens which is a negative lens, and
wherein assuming that
a refractive index of the LN lens at a d line is $Ndn$, an Abbe number of the LN lens based on the d line is $vdn$, and
a partial dispersion ratio of the LN lens between a g line and an F line is $\theta gFn$,
the LN lens satisfies Conditional Expressions (1), (2), (3), and (4) represented by $$1.72 < Ndn < 1.8 \tag{1},$$

$$43 < vdn < 57 \tag{2},$$

$$0.6355 < \theta gFn + 0.001625 \times vdn < 0.66 \tag{3, and}$$

$$2.21 < Ndn + 0.01 \times vdn \tag{4}.$$

2. The zoom lens according to claim 1,
wherein the movable lens group, which has the negative refractive power in the middle group, closer to the object side than the movable lens group, which has the negative refractive power and is closest to the image side in the middle group, includes the LN lens, and
wherein assuming that
a focal length of the movable lens group which has the negative refractive power in the middle group and includes the LN lens, which has a strongest negative refractive power among the LN lenses, which are included in the movable lens group having the negative refractive power in the middle group and being located to be closer to the object side than the movable lens group, which has the negative refractive power and is closest to the image side in the middle group, is $fA$, and
a focal length of the movable lens group, which has the negative refractive power and is closest to the image side in the middle group, is $fB$,
Conditional Expression (5) is satisfied, which is represented by $$0.6 < fB/fA < 4.5 \tag{5}.$$

3. The zoom lens according to claim 2, wherein Conditional Expression (5-1) is satisfied, which is represented by $$2 < fB/fA < 4 \tag{5-1}.$$

4. The zoom lens according to claim 1,
wherein the movable lens group, which has the negative refractive power in the middle group, closer to the object side than the movable lens group, which has the negative refractive power and is closest to the image side in the middle group, includes the LN lens, and
wherein assuming that
a focal length of the movable lens group which has the negative refractive power in the middle group and includes the LN lens, which has a strongest negative refractive power among the LN lenses, which are included in the movable lens group having the negative refractive power in the middle group and being located to be closer to the object side than the movable lens group, which has the negative refractive power and is closest to the image side in the middle group, is $fA$, and
a focal length of the LN lens, which has the strongest negative refractive power, among the LN lenses, which are included in the movable lens group having the negative refractive power in the middle group, is $fLNm$,
Conditional Expression (6) is satisfied, which is represented by $$0.5 < fLNm/fA < 40 \tag{6}.$$

5. The zoom lens according to claim 4, wherein Conditional Expression (6-1) is satisfied, which is represented by $$0.5 < fLNm/fA < 4 \tag{6-1}.$$

6. The zoom lens according to claim 1, wherein the at least one movable lens group in the middle group includes a cemented lens in which at least one LN lens and at least one positive lens are cemented.

7. The zoom lens according to claim 6, wherein assuming that an Abbe number of the at least one LN lens of the cemented lens based on the d line is vdcn, and an Abbe number of at least one positive lens of the cemented lens based on the d line is vdcp, at least one of the cemented lenses satisfies Conditional Expression (7) represented by $$18 < vdcn - vdcp < 35 \qquad (7).$$

8. The zoom lens according to claim 1, wherein the movable lens group having the strongest negative refractive power among the movable lens groups having the negative refractive powers in the middle group includes the LN lens.

9. The zoom lens according to claim 1, wherein focusing is performed by moving at least a part of lenses in the first lens group along the optical axis.

10. The zoom lens according to claim 1, wherein the movable lens group closest to the image side in the middle group has a negative refractive power.

11. The zoom lens according to claim 10, wherein the middle group consists of the two movable lens groups having the negative refractive powers, and wherein the subsequent group consists of a lens group which remains stationary with respect to the image plane during zooming and has a positive refractive power.

12. The zoom lens according to claim 10, wherein the middle group consists of the two movable lens groups having the negative refractive powers, and wherein the subsequent group consists of, in order from the object side to the image side, a lens group, which moves along the optical axis by changing a distance between the groups adjacent to each other during zooming and has a positive refractive power, and a lens group which remains stationary with respect to the image plane during zooming and has a positive refractive power.

13. The zoom lens according to claim 10, wherein the middle group consists of, in order from the object side to the image side, the movable lens group having a positive refractive power and the two movable lens groups having the negative refractive powers, and wherein the subsequent group consists of a lens group which remains stationary with respect to the image plane during zooming and has a positive refractive power.

14. The zoom lens according to claim 10, wherein the middle group consists of the three movable lens groups having the negative refractive powers, and wherein the subsequent group consists of a lens group which remains stationary with respect to the image plane during zooming and has a refractive power.

15. The zoom lens according to claim 10, wherein the middle group consists of the four movable lens groups having the negative refractive powers, and wherein the subsequent group consists of a lens group which remains stationary with respect to the image plane during zooming and has a positive refractive power.

16. The zoom lens according to claim 1, wherein the LN lens further satisfies Conditional Expression (2-1) represented by $$45 < vdn < 55 \qquad (2\text{-}1).$$

17. The zoom lens according to claim 1, wherein the LN lens further satisfies Conditional Expression (3-1) represented by $$0.637 < \theta gFn + 0.001625 \times vdn < 0.65 \qquad (3\text{-}1).$$

18. The zoom lens according to claim 1, wherein the LN lens further satisfies Conditional Expression (4-1) represented by $$2.21 < Ndn + 0.01 \times vdn < 2.33 \qquad (4\text{-}1).$$

19. An imaging apparatus comprising the zoom lens according to claim 1.

* * * * *